(12) United States Patent
Marrillet et al.

(10) Patent No.: US 8,481,799 B2
(45) Date of Patent: Jul. 9, 2013

(54) PROCESS FOR PACKAGING RADIOACTIVE WASTES IN THE FORM OF SYNTHETIC ROCK

(75) Inventors: José Marrillet, Lattes-Maurin (FR); Bernard Rottner, Marseilles (FR)

(73) Assignee: Onectra (FR)

( * ) Notice: Subject to any disclaimer, the term of this patent is extended or adjusted under 35 U.S.C. 154(b) by 123 days.

(21) Appl. No.: 13/260,355

(22) PCT Filed: Mar. 24, 2010

(86) PCT No.: PCT/FR2010/050532
§ 371 (c)(1),
(2), (4) Date: Sep. 26, 2011

(87) PCT Pub. No.: WO2010/112732
PCT Pub. Date: Oct. 7, 2010

(65) Prior Publication Data
US 2012/0022311 A1    Jan. 26, 2012

(30) Foreign Application Priority Data
Mar. 31, 2009 (FR) .................................. 09 52040

(51) Int. Cl.
*G21F 9/16* (2006.01)
(52) U.S. Cl.
USPC .............................. 588/11; 588/314; 588/901
(58) Field of Classification Search
USPC .................... 588/11, 4, 15, 18, 313, 314, 410, 588/412, 249, 259, 900, 901
See application file for complete search history.

(56) References Cited

U.S. PATENT DOCUMENTS

| 4,772,431 A | 9/1988 | Aubert |
| 7,019,189 B1 | 3/2006 | Chekhmir et al. |

FOREIGN PATENT DOCUMENTS

| FR | 2487328 | 1/1982 |
| FR | 2741552 | 5/1997 |

*Primary Examiner* — Edward Johnson
(74) *Attorney, Agent, or Firm* — Ladas & Parry, LLP

(57) ABSTRACT

The present invention relates to a process for packaging radioactive wastes, in which the following successive steps are carried out:

a/ radioactive wastes, the solids content of which comprises at least 90% of compounds selected from $CaCO_2$, $Fe_2O_3$, $SiO_2$, $Al_2O_3$ and $B_2O_3$, are supplemented, so as to achieve a target composition of said supplemented wastes after calcination, and b/ said supplemented radioactive wastes are melted and c/ said melt is poured into a container, so as to obtain, after cooling, a product comprising a vitreous or vitro-crystalline synthetic rock, having said target composition, characterized in that said target composition corresponds to the following definition, in a $CaO$, $SiO_2$ and $X_2O_3$ ternary system, in which $X_2O_3$ is a trivalent oxide or a mixture of trivalent oxides selected from $Al_2O_3$, $Fe_2O_3$ or $B_2O_3$, $P_C$ and $P_S$ being the mass percentages of $CaO$ and $SiO_2$:

$P_C$ is from 35 to 60%, and $P_S$ is from 10 to 45%.

15 Claims, 7 Drawing Sheets

PROCESS FOR PACKAGING RADIOACTIVE WASTES IN THE FORM OF SYNTHETIC ROCK

This application is a 371 of PCT/FR2010/050532, filed on Mar. 24, 2010, which is incorporated herein by reference.

The present invention relates to a process for packaging radioactive wastes, in which radioactive wastes are melted and after cooling a monolith of mineral, glassy or vitrocrystalline rock is obtained in which are included said radioactive wastes.

The present invention more particularly relates to a method for treating a particularly category of radioactive wastes, i.e. radioactive wastes so-called WA/MA (i.e. weakly active or moderately active) radioactive waste, intended to be stored at the surface. These are radioactive wastes, the residual radioactivity of which after 300 years should have decreased so as not to form any longer a health risk after this period.

Among these wastes, are essentially distinguished:
so-called "homogeneous" wastes of small grain size, notably of less than 1 mm, such as earths, sludges, ashes, sands, dusts or powders, filter dusts, and
so-called "heterogeneous" wastes of larger grain size, notably greater than 1 cm, preferably from 1 to 5 cm, such as stones, concrete rubble, scrap iron, plastics, glass, . . .

The method according to the invention in practice essentially tackles homogeneous waste, but also concerns certain heterogeneous wastes such as concrete rubble, as explained hereafter.

The method according to the present invention more particularly relates to the treatment of material essentially consisting of limestone ($CaCO_3$), silica ($SiO_2$) and trivalent oxides, such as alumina ($Al_2O_3$) or hematite ($Fe_2O_3$) and, optionally boric anhydride ($B_2O_3$).

This type of material is again found in:
a—limestone soils based on aluminosilicate, calcium carbonate and silica, contaminated as a result of radioactive leaks outside a nuclear plant. About 5,000 m³ in volume of contaminated soil to be treated in France are evaluated.

b—sludges produced by nuclear facilities, including nuclear power stations, including residues consisting of a mixture of metal oxides, of concrete dust from the building, organic products and water stemming from the process. The volume of dry extracts of these contaminated sludges to be treated represents at least 100 m³/year.

c—concretes from infrastructures of nuclear facilities, including old shutdown power reactors, at the end of their lifetime, to be dismantled. This third source represents at least 10,000 m³ of WA/MA concrete.

In the processes presently used for packaging WA/MA waste targeted by the method according to the invention, the main technique applied today consists of mixing them with a grout of mortar so as to form after drying a concrete block containing the initial waste and its radioactivity. The major drawback of this technique is that the incorporation rates, i.e. the volume of the initial waste divided by the volume of the final concrete are very low, i.e. between 0.2 and 0.5 depending on the treated waste. In other words, the volume of the final concrete is very large relatively to the volume of initial waste, which involves high storage costs since storage costs are related to the stored volume. On the other hand, industrial amounts of non-radioactive cement and concrete are transformed into radioactive waste.

Development of other methods has been attempted in order to increase the incorporation rate of the waste, as an alternative to immobilization in a matrix of hydraulic binders, such as mortar.

In particular, in FR 2 741 552, a method is described for packaging toxic waste consisting in immobilizing the wastes in a glassy matrix, i.e. leading to obtaining a monolith having the composition of the lower melting temperature ternary eutectic point in the ternary phase diagram at thermodynamic equilibrium for CAS (lime/alumina/silica), i.e. at a theoretical thermodynamic melting temperature of less than 1,300° C.

To do this, the composition of the radioactive wastes to be packaged is adjusted with limestone, silica and/or alumina compounds, so as to obtain after melting, a final target composition around the relevant ternary eutectic, with:
10 to 16% by weight of $Al_2O_3$, and
59 to 65% by weight of $SiO_2$, and
22 to 28% by weight of $CaO$.

In the materials of radioactive wastes targeted by the method according to the invention, water evaporates from 100° C. onwards, organic materials burn between 300 and 500° C. and calcium carbonate dissociates around 900° C. in order to become lime ($CaO$) while degassing $CO_2$. Other products which may enter the composition of the radioactive wastes to be treated, or even the composition of the additives, decompose at high temperature and become oxides, such as nitrates, sulfates. Because of the evaporation of water, of the combustion of organic products and of calcinations, the wastes intended to be treated lose mass by heating at high temperature. The ignition loss rate, i.e. the mass lost divided by the initial mass, may be from 25 to 40%, which, with the densification effect when passing from a divided solid to a monolith, explains the possibility of reducing the volume of wastes with a significant incorporation rate.

However, this method has a certain number of the following drawbacks which prevents it from being applied to industrial manufacturing:

The strong silica content of the obtained glass (59 to 65% by weight of $SiO_2$) has the consequence of strong viscosity of the melt, especially at low temperature (less than 1,300° C.), which makes it difficult to homogenize the melt when the latter represents a large volume. Now, degassings still occur beyond 1,000° C., which generates bubbles in the melt. These bubbles cannot escape from the melt considering its strong viscosity, so that the incorporation rate of radioactive wastes into the final monolith is thereby decreased.

Considering these risks of breaking up the glass, patent FR 2 741 552 imposes the application of a step for annealing the monolith at a temperature above 700° C. before the cooling step. The recommended cooling rate for glass blocks of industrial size is 1° C./h from an annealing temperature of 750° C. This imposes a one month period for cooling the monolith before reaching room temperature. For an industrial plant treating 1,000 tons a year, a cooling oven should be able to contain up to 400 glass blocks immobilized for one month.

Moreover, the composition of the glass, in its ternary eutectic composition, is quite far from that of most radioactive wastes based on limestone soil and/or concrete, requiring consequently an adjustment of the composition leading to doubling of the initial mass of the waste in order to obtain the target composition. In practice, the obtained incorporation rate in FR 2 741 552 does not exceed 2.

Finally, taking into account the inhomogeneity of the product to be melted, it is necessary to apply a melting temperature much higher than the theoretical thermodynamic melting temperature, as explained hereafter.

For all these reasons, the method described in FR 2 741 552 was never applied industrially.

Methods are also known, as described in FR 2 502 999, consisting of making an artificial rock, i.e. a solid including crystalline phases and glassy phases, by immersing electrodes in the radioactive wastes to be confined, and of then having a current pass through them until the environment of the electrodes is melted. In WO 03/038361, this treatment is directly applied to wastes packaged in containers.

This method is not applicable as such to the treatment of radioactive wastes consisting in limestone soils and/or concrete rubble or sludges from nuclear power stations, since the limestone which they contain, produces lime which violently reacts with water and is extremely soluble, which is incompatible with the packaging of radioactive waste. Further, the limestone is transformed into lime at 900° C. with emission of $CO_2$, but lime (CaO) melts at more than 2,500° C. At this temperature, most radioactive elements (cesium, ruthenium, plutonium) are volatile. Finally the metal or concrete container of the waste would not withstand these temperatures.

The object of the present invention is to provide a method for confinement-packaging of radioactive waste, with which a high incorporation rate greater than 2 notably from 2 to 4, may be attained under industrial application conditions.

Another object of the present invention is to provide a final waste confined as a more or less crystallized monolith of the glassy or polycrystalline type with grain boundaries (artificial rock) which meets the solid block's properties of strength to compression of at least 8 MPa and of insolubility which makes it capable of being stored in surface storage centers.

The compression strength criterion means that the final waste block should be sufficiently solid so as not to break up into small pieces, during the cooling or subsequently.

The insolubility criterion means that the final waste should not be soluble and especially it should not react with water.

Finally, another object of the present invention is to provide a confinement method which allows industrial application with reduced cooling time, of course without having the thermal cooling stresses breaking up the block, and a melting temperature compatible with retaining at least 50% of the volatile radioactive elements in the melt.

The method according to the invention consists of heating wastes after adjustment of their composition, by adding additives or by mixing wastes, so as to melt them and to pour them into a container in which they are packaged as artificial rock or glass monoliths.

More specifically, the present invention provides a method for packaging radioactive waste, wherein the following successive steps are accomplished:

a/ radioactive wastes are treated, for which the composition of the dry extract after calcination at 950° C., called the starting composition hereafter, comprises at least 90% of compounds selected from CaO, $Fe_2O_3$, $SiO_2$, $Al_2O_3$ and $B_2O_3$, and the composition of said wastes is supplemented so as to attain a target composition of said supplemented wastes after calcination, and b/ said supplemented radioactive wastes are melted and c/ said melt is cast into a container, so as to obtain after cooling a product comprising a synthetic, glassy or vitro-crystalline rock, having said target composition, characterized in that said starting composition and said target composition meet the following definitions, in a ternary system CaO, $SiO_2$ et $X_2O_3$, wherein $X_2O_3$ is a trivalent oxide or a mixture of trivalent oxides selected from $Al_2O_3$, $Fe_2O_3$ et $B_2O_3$:

for said starting composition:
$P_C$ and $P_X$ are less than 90%, and
$P_S$ is less than 75%, and for said target composition:
$P_C$ is from 35 to 60%, preferably from 40 to 50%, and
$P_S$ is from 10 to 45%, preferably from 20 to 40%, with in both cases:
$P_C+P_S+P_X=100\%$, and
$P_X=P_A+P_H+P_B$, with
$P_C=[M_C/(M_C+M_S+M_A+0.28M_H+2M_B)]\times100\%$, and
$P_S=[M_S/(M_C+M_S+M_A+0.28M_H+2M_B)]\times100\%$, and
$P_A=[M_A/(M_C+M_S+M_A+0.28M_H+2M_B)]\times100\%$, and
$P_H=[0.28M_H/(M_C+M_S+M_A+0.28M_H+2M_B)]\times100\%$, and
$P_B=[2M_B/(M_C+M_S+M_A+0.28M_H+2M_B)]\times100\%$, and
$P_i$ and $M_i$, with i=C, S, A, H or B, are the mass percentages ($P_i$) and the masses ($M_i$), of CaO (i=C), $SiO_2$ (i=S), $Al_2O_3$ (i=A), $Fe_2O_3$ (i=H) and $B_2O_3$ (i=B), respectively.

It is understood that in step a/, the composition of said radioactive waste is supplemented so as to attain a said target composition, which is also the composition of the monolith obtained at the end of step c/.

By "starting composition" is meant here the composition of non-supplemented radioactive wastes, the latter however being calculated according to what it would be after calcination.

In the starting composition, the mass percentage is based on the mass of CaO and not of $CaCO_3$, and/or $Ca(OH)_2$, if necessary, since $CaCO_3$ and $Ca(OH)_2$ after calcination at 950° C. are transformed into CaO. Also, as regards alumina, silica and boron oxide, the starting radioactive wastes generally rather comprise pre-cursors, such as hydrates, silicate, sulfate, nitrate salts, of acids, notably boric acid $H_3BO_3$, and/or hydroxides of these molecules giving, after calcination, alumina, silica and boron oxide.

It is thus possible to locate the starting composition and the target composition in the same ternary CaO, $SiO_2$, $X_2O_3$ diagram.

This target composition is particularly advantageous since with it, as this will be explained hereafter, a melt may be obtained which is relatively fluid and therefore more homogeneous, whence the result that it is possible to obtain glassy or crystalline monoliths having advantageous mechanical properties without requiring any annealing and with reduced cooling times. This is in particular due to the fact that in this relatively reduced domain of the target composition the ternary lime/alumina/silica, lime/hematite/silica and lime/boric anhydride/silica ternary diagrams have similarities in every case with an eutectic valley substantially at the centre of the thereby defined parallelograms, as explained hereafter and illustrated in FIG. 1. The parallelogram is voluntarily defined so that the eutectic valley is excentered because of the dissymmetry of the valley having an abrupt left flank (the melting temperature increases very rapidly upon moving away from the eutectic) and a straight flank with a gentle slope.

A monolith of a target composition, as defined above, gives the possibility of attaining incorporation rates (initial waste volume/waste volume packaged as a monolith) of greater than 2 for wastes for which said starting composition consists of at least 90% of compounds selected from CaO, $SiO_2$, $Al_2O_3$, $Fe_2O_3$ and $B_2O_3$, on the one hand, and which meet the following mass percentages, after calcination, in a (CaO, $SiO_2$, $X_2O_3$) ternary system as defined above:

$P_S<75\%$, $P_C<90\%$, and $P_X<90\%$.

In particular, it is observed that incorporation rates comprised between 2.4 and 8.1 are obtained according to the composition of the starting wastes.

Another advantage of this target composition of the monoliths including the immobilized radioactive wastes in a more or less crystallized solid block in the form of glass or preferably in the form of an artificial rock of polycrystalline solids with grain boundaries, is that it observes regulatory specifications in terms of the solid block's compressive strength of at least 8 MPa, and of resistance to solubilization.

Moreover, this method is particularly of interest in an industrial application since with it:

it is possible to cast large blocks of said monoliths, notably of at least 200 L, or even up to 500 L, within a reasonable cooling time, notably not more than two weeks or even not more than a week and for most of the time within less than 24 hours, without of course having the thermal stresses break up the block into small pieces during cooling, and at least 50% of the volatile radioactive elements such as cesium or plutonium are retained in the melted pool and then in the solid monolith block.

The composition, in the (CaO, $SiO_2$, $X_2O_3$) ternary system corresponds to a crystalline phase domain in the different ternary diagrams (CaO, $SiO_2$, $Al_2O_3$), (CaO, $SiO_2$, $Fe_2O_3$) and (CaO, $SiO_2$, $Be_2O_3$) corresponding to the region of eutectic valleys, i.e.:

for the CAS (lime/alumina/silica) diagram (FIG. 1), the eutectic valley separating larnite ($Ca_2SiO_4$) and gehlenite ($Ca_2Al_2SiO_7$) on the one hand, and the eutectic valleys between larnite and rankinite ($3CaO.2SiO_2$) and pseudo-wollastonite ($CaO.SiO_2$) on the other hand and, the eutectic value separating pseudo-wollastonite and gehlenite with a triple pseudo-wollastonite/gehlenite/anorthite ($CaO.Al_2O_3.2SiO_2$) eutectic, and finally at the bottom of the diagram, the 2 valleys between $3CaO.Al_2O_3$, $5CaO.3Al_2O_3$ and $CaO.Al_2O_3$.

for the lime/hematite/silica ternary diagram (FIG. 4), this target composition corresponds to the regions of the eutectic valleys between larnite and hematite, larnite and rankinite, rankinite and pseudo-wollastonite, and at the bottom of the diagram the whole of the valleys between $2CaO.Fe_2O_3$, $CaO.Fe_2O_3$, $CaO.2Fe_2O_3$ and hematite.

for the lime/boric anhydride/silica diagram (FIG. 5), this target composition corresponds to the regions of the eutectic valleys between larnite ($2CaO.SiO_2$, indicated as "$C_2S$" in the diagram) and pseudo-wollastonite ($CaO.SiO_2$), and then lower down, between the compounds $3CaO.B_2O_3$ et $2CaO.B_2O_3$.

Initially, the inventors tested wastes based on limestone soil by adding thereto alumina, and various other wastes based on $CaCO_3$, $SiO_2$ and $Al_2O_3$ by adding alumina thereto. In this way, they defined a target composition domain as defined above in the ternary CAS diagram. Next, they empirically noticed that by replacing alumina with other trivalent oxides, i.e. boric anhydride $B_2O_3$, notably present in a large amount in evaporator concentrates of nuclear power stations, and hematite $Fe_2O_3$, present in a large amount in the sludges of nuclear power plants, hematite $Fe_2O_3$ and boric anhydride $B_2O_3$ may be assimilated to alumina in the CAS (lime/alumina/silica) diagram, insofar that coefficients of 0.28 and 2, respectively described above are ascribed to the considered masses of hematite and boric anhydride. In other words, a total mass of trivalent oxide is taken into account, equivalent to alumina, i.e. the addition of the actual alumina mass+0.28 time the hematite mass+2 times the boric anhydride mass. In this case, the target composition corresponds to compositions contained in a theoretical diagram CXS, X representing $X_2O_3$, i.e. a mixture of $Al_2O_3$, $Fe_2O_3$ et $B_2O_3$, and corresponding to the parallelogram A of FIG. 1 in the CAS diagram.

The equivalent coefficients of 0.28 and 2 mentioned above do not simply result from an empiric observation but are corroborated from the comparison of the lime/alumina/silica, lime/hematite/silica and lime/boric anhydride/silica ternary diagrams, as explained later on with reference to FIG. 8, and resulting from that:

a relatively rectilinear set of eutectic valleys joins the point M of the CaO—$SiO_2$ to a point of the line CaO—$X_2O_3$ in the three triangles of the three ternary diagrams, and the position of the point M does not depend on the nature of the trivalent oxide and is located in the domain of rankinite. On the other hand, the positions of point P, for the diagrams of the various trivalent oxides, allow determination of these equivalence coefficients.

Further it will be noted that in the three diagrams, if the composition is unbalanced so as to have it deviate from the eutectic, the melting temperature increases relatively rapidly on the left of the valley (lime excess) and relatively more slowly on the right of the valley (lime shortage).

According to the present invention, the fact that the regions of the target composition are around binary eutectic valleys rather than around a ternary eutectic as in FR 2 741 552, is much better adapted to the treatment of waste. Indeed, the composition of a waste is naturally variable and a valley extending around one substantially rectilinear line in a ternary diagram, provides a much larger range of target compositions, which allows this target composition to be obtained by applying, if required, reduced amounts of additives as compared with those required for a monolith with a composition around a ternary point, such as in the prior patent FR 2 741 552.

Finally, another advantage of the target composition according to the present invention lies in that the silica contents are comparatively reduced with respect to those of the composition of the ternary eutectic of the prior patent FR 2 741 552, which corresponds to a comparatively reduced viscosity. The result of this is a reduced gap between the actual melting temperature and the theoretical thermodynamic melting temperature.

Indeed, the melting temperatures indicated in the ternary diagrams, such as the CAS diagrams, are temperatures of thermodynamic equilibrium, in the sense that they were obtained by first melting the mixture at a higher temperature so as to perfectly homogenize the pool, and then by slowly reducing the temperature and by measuring the crystallization temperature. However, in practice, the heterogeneity of the mixture imposes heating far beyond the thermodynamic temperature in order to obtain melting of the different constituents of $SiO_2$, $CaCO_3$ and $X_2O_3$ aggregates. Indeed, even with an intimate mixture, for example soil with alumina powder, a grain of alumina and a grain of earth will have to be melted in order to obtain a mixture on a molecular scale, i.e. homogenization of the chemical composition.

Thus, the tests show that the selected eutectic according to the present invention has interesting characteristics for melting wastes since the actual melting temperature does not exceed the thermodynamic temperature by more than 100° C. or even 70° C., for treating earth supplemented with alumina, 270° C. for treating concrete supplemented with alumina, while, for a glass around the ternary eutectic composition according to patent FR 2 741 752, the deviation may exceed 500° C., which strongly decreases the benefit of working around the ternary eutectic point of the CAS diagram at a theoretical thermodynamic temperature of 1,170° C., but which, for reasons of homogenization of the chemical composition, actually requires melting temperatures substantially identical with those obtained according to the present invention.

Moreover, finally, low viscosity limits the continued presence of gas bubbles in the final product, which would have a negative effect on the incorporation rate on the one hand but also on the mechanical resistance to breaking up on the other hand, it being understood that as mentioned earlier, within the scope of treatment of radioactive wastes, the goal is to obtain a solid block resisting to cracking and breaking up.

Target compositions are preferred, which have a silica content $P_S$ of less than 40%, so as to reduce the viscosity of the melt and, thus facilitate homogenization thereof and reduce the melting temperature.

More particularly, a method according to the present invention has the following characteristics:
in step b/, the radioactive wastes are heated in a crucible and are melted to a temperature from 1,250 to 1,650° C., and
in step c/, said melt is cast into a container, preferably with a capacity of at least 200 L, still preferably with a capacity of at least 500 L, so as to form said monoliths and said melt packaged in this way is cooled, without annealing, down to room temperature, within a period of less than 15 days, preferably less than a week, still preferably less than 24 hours.

For monoliths with a reduced weight of less than or equal to 2 kg, cooling may even be obtained within less than 2 hours.

It is understood that in step b/, the melting temperature represents the temperature at which the melt mixture is homogenized as regards chemical composition.

The presence of hematite ($Fe_2O_3$) and/or of boric anhydride ($B_2O_3$) in the place of and/or as a supplement to alumina ($Al_2O_3$) in said target composition has the effect of significantly lowering the melting temperature values, especially in the presence of boric anhydride.

In practice, target monoliths as described above are obtained from these initial products with melting temperatures comprised between 1,550 and 1,620° C., most often between 1,500 and 1,600° C., in the absence of boron oxide or boric anhydride in the target composition.

In a preferred embodiment, in step c/, a cooling step is carried out in two steps, namely:
c.1/ the cooling rate of said container filled with said melt is limited in the cooling phase between 1,250 and 1,000° C., to a cooling rate comprised between 50° C./h and 250° C./h, preferably by burying it in a bed of refractory material particles, such as alumina particles, and by letting it cool naturally in room temperature premises and still preferably by sweeping said container with an airflow at room temperature, at a rate from 0.1 to 1 m/s, and then
c.2/ the cooling of said container from 1,000° C. down to room temperature is finished without limiting the cooling rate, preferably by placing said container in open air or by quenching it in cold water until its temperature decreases down to room temperature.

In step c.1/ above, the rate is decreased so as to allow crystallization of the monolith, while retaining a minimum cooling rate, so that said container does not melt.

More particularly, said radioactive wastes comprise of limestone soil, concrete rubble, sludges from nuclear power plants, concentrates from evaporators of nuclear power plants, sand, and/or ashes from incinerated radioactive wastes.

Still more particularly, said starting radioactive wastes have an starting composition meeting the following definition in the $CaO/SiO_2/X_2O_3$ ternary system, wherein $X_2O_3$ and $P_I$ have the meanings given earlier:
Pc and $P_X$ are less than 75% and Ps is less than 60%.

In a preferred embodiment, said target composition corresponds to the following mass percentages:
$P_C$ is comprised between 40 and 50%, and
$P_S$ is comprised between 20 and 40%.

With this target composition domain, a polycrystalline material may be obtained by aiming at a composition close to but different from the eutectic, it being understood that obtaining a polycrystalline material is more favorable than obtaining a glass. Indeed, the polycrystalline material generally resists better than glass with generated internal stresses during the cooling, even if the latter is very fast, for less than 24 hours, and therefore does not risk any breaking up under the effect of these stresses. Crystallization is promoted through two effects: by deviating from the eutectic or by reducing the cooling rate around the crystallization temperature (between 1,250° C. and 1,000° C. in our case). When deviating from the eutectic, it is better to aim the domain of gehlenite where the melting temperatures increase very little above that of the eutectic, rather than that of larnite, where the melting temperatures increase very rapidly.

Still more particularly, in a method according to the invention, steps are performed with according to which:
a.1/ a limestone soil and/or concrete rubble is treated, for which the starting composition meets the following definition in a ternary $CaO/SiO_2/X_2O$ system, wherein $X_2O_3$ and $P_I$ have the meanings given above:
$P_C$ is comprised between 30 and 80%, and
$P_X$ is less than 20%.
a.2/ 5 to 50% of $X_2O_3$, selected from $Al_2O_3$, $Fe_2O_3$ et $B_2O_3$ are added.

Still more particularly, in step a.2/, it is proceeded with addition of less than 10% of $B_2O_3$, preferably less than 5% of the mass of the radioactive wastes to be treated and/or $P_B$ is less than 15%, preferably less than 7% in said target composition of the obtained monolith.

Boric anhydride has the property of reducing the melting temperature of our mixture. Thus, by adding 10% of boric anhydride based on the mass of radioactive wastes to be treated, one manages to lower the melting temperature to 1,250° C. for treatment of limestone soil, concrete rubble and/or sludges from nuclear power stations. However, boric anhydride has the drawback of melting at a very low temperature, i.e. from 300° C., so that in the presence of boron oxide or molten boric anhydride, the gas evolvements generated by calcination of the carbonates, which occurs around 900° C., produces a foam, the result being that an extremely porous material is obtained. This is why preferably addition of boron oxide or boric anhydride is limited to 5%, which is sufficient for lowering the melting temperature by about 100° C. for treating radioactive wastes consisting of limestone soil and/or concrete rubble and/or sludges from nuclear power stations.

Still preferably, in step a.2/:
the addition of $B_2O_3$ is less than 5% of the mass of radioactive wastes to be treated in step a.1/ and/or $P_B$ is less than 7% in said target composition of the obtained monolith, and
addition of $Al_2O_3$ and $Fe_2O_3$ is greater than 10%, preferably greater than 20% of the mass of radioactive wastes to be treated in step a.1/, and/or $P_X$ is greater than 15%, preferably greater than 30% in said target composition of the obtained monolith.

Insofar that is often difficult to accurately measure the composition of the starting radioactive wastes and/or of the additions, taking into account their inhomogeneity, it seems relevant to also characterize them according to the sought target composition. This is why the addition of boron oxide was characterized above by giving the value of $P_B$ in said target composition of the monolith. It is possible to trace back the composition of the addition by a computation, by subtracting the starting composition and by taking into account the mass loss by melting or loss on ignition.

According to an advantageous alternative embodiment of the invention, the mixing of the radioactive wastes of different compositions is carried out in order to obtain said target composition, without adding any non-radioactive trivalent oxide(s) selected from $Al_2O_3$, $Fe_2O_3$ et $B_2O_3$.

Treatment of the starting products may thus be contemplated, i.e. of the radioactive wastes, outside the general definition of the composition of radioactive wastes as given above, i.e. $P_C$ and $P_X$ less than 75% and $P_S$ less than 60%, insofar that the mixing directly results in said target composition. Further, incorporation rates greater than 3 are obtained.

Still more particularly, it is proceeded with the mixing of:
1/ a so-called limestone soil and/or said concrete rubble of said following starting compositions:
$P_C$ comprised between 50 and 80%, and
2/ a sludge of radioactive wastes, preferably a sludge from a nuclear power plant, of said following starting composition:
$P_X$ comprised between 10 and 70%, preferably from 15 to 40% and $P_C$ less than 50%, preferably less than 35%, notably from 30 to 40%.

In both composition domains of radioactive earth and sludge respectively, in each type of soil composition, there exists at least one suitable sludge composition for directly obtaining the target composition by mixing both wastes in a relative mass percent proportion from 30/70 to 70/30, preferably from 40/60 to 60/40.

More particularly, in a method according to the invention, in step a/, the following steps are performed wherein:
a.1/ limestone soil and/or concrete rubble are treated, said starting composition of which meets the following definition, in the ternary $CaO/SiO_3/X_2O_3$ system:
$P_C$ is comprised between 50 and 80%, and
$P_S$ is comprised between 20 and 50%, and
$P_X$ is less than or equal to 20%, preferably comprised between 4 and 10%, $X_2O_3$ being a trivalent oxide or a mixture of trivalent oxides selected from $Al_2O_3$ and $Fe_2O_3$, and $P_B=0$, and
a.2/ the additive containing $X_2O_3$ is added so as to reach said following monolith target composition in the ternary $CaO/SiO_3/X_2O_3$ system:
$P_C$ is comprised between 35 and 55%, and
$P_S$ is comprised between 15 and 40%, and
$P_X$ is comprised between 10 and 45%.

In an advantageous embodiment, the big stones are extracted from the limestone soils so as to approach said starting composition of said target composition.

More particularly, big particles with a size of more than 1 cm, preferably more than 5 cm are extracted from the limestone soils so that the composition of the fine portion approaches said target composition, preferably so that it attains said target composition.

Still more particularly, big particles are extracted from limestone soils, with a grain size cut-off threshold with which 20 to 80% of the initial soil mass may be eliminated. Depending on the grain size distribution of the soil, this threshold will be greater than 1 cm, preferably greater than 5 cm.

The grain size separation of stones, notably upon treating a limestone soil, has two benefits:
when the contamination is of exogenous origin, which is most often the case, the small or large grains are contaminated at the surface but not in the bulk. Accordingly, the small grains have a higher radioactive mass activity than those of the big ones, and the stones essentially consist of limestone with a clay gangue, which is more concentrated in alumina than the crude soil, so that separation of the large size stones gives the possibility of decreasing the amount of alumina to be added to the wastes in order to obtain the target composition.

Thus, grain size sorting of the radioactive soil to be treated may even allow modification of said starting composition so that it enters the definition of said target composition, by extracting the big stones, which may then be transformed into VWA wastes by simple washing.

In a particular embodiment, in step b/, heating of the wastes and then of the pool is accomplished by radiation from an electric arc produced above the wastes.

In another particular embodiment, in step b/, heating is started by radiation from an electric arc above the wastes, and then when the wastes begin to melt, the electrodes are immersed into the pool in order to complete the heating.

In this particular embodiment, when the electrodes are in graphite, in the presence of the graphite of the electrodes, the iron oxide present in the wastes to be treated are reduced into metal iron, according to the same chemical reactions as those occurring in a blast furnace when iron ore is heated in the presence of coal.

The melt then separates into two phases, one consisting of the synthetic rock having said target composition according to the invention, the other consisting of cast iron (iron plus carbon) After solidification, the iron is again found in the form of small metal inclusions in the synthetic rock, said small inclusions being of a size of less than 2 cm, in practice of the order of 0.5 to 2 cm. These inclusions were observed for small amounts of iron and/or iron oxide, i.e. less than 20% of the mass depending on the operating conditions. In the presence of larger amounts of iron and/or iron oxide, the bottom of the block consists of cast iron, the top of the block consists of synthetic rock and small inclusions are incorporated into the synthetic rock at the interface with the cast iron.

In a particular embodiment, the method therefore comprises the following characteristics:
in step b/, said additional radioactive wastes are melted by Joule effect heating, with graphite electrodes immersed in the radioactive waste material to be treated, and
in step c/, a bi-phasic product is contained, comprising a synthetic rock matrix having said target composition in which $X_2O_3$ is selected from $Al_2O_3$ and $B_2O_3$, said matrix incorporating cast iron inclusions.

It is understood that the total mass of cast iron inclusions is in relationship with the mass of iron or iron oxide initially contained in the starting compositions, preferably less than 20%.

Preferably, said radioactive waste material is placed in a cooled crucible consisting of joined steel pipes, in which a liquid is circulated such as water, so as to maintain the crucible at a temperature below the melting temperature of the steel entering its composition.

In a known way, these crucibles consist of steel pipes through which water flows, so as to maintain the temperature of the steel at a temperature below the melting temperature of steel, i.e. about 1,550° C.

According to other advantages features of a method according to the invention:
before introducing said radioactive wastes into said crucible, it is proceeded with the milling of said radioactive wastes, preferably in order to obtain a grain size of less than 5 cm, still preferably less than 1 cm, of at least one portion of the particles which it contains, and
the fumes evolved during the melting of the radioactive wastes are cooled to less than 200° C. and gaseous radio-elements such as cesium, which they contain, are trapped in a particle filter.

Other features and advantages of the present invention will become apparent in the light of several detailed exemplary embodiments, made with reference to FIGS. 1 to 8, wherein:

FIGS. 1 to 3 represent CAS ternary diagrams with:
the representation of the domain A of the target composition according to the invention and of the domain B of the glassy ternary composition of patent FR 2 741 552, in FIG. 1, and
the representation of the treated concrete and earth composition and the obtained artificial rock, in FIG. 2, and
the indication of the earth and sludge compositions as well as of the obtained mixture, in FIG. 3;

A—TREATED WASTES

Figure 1:
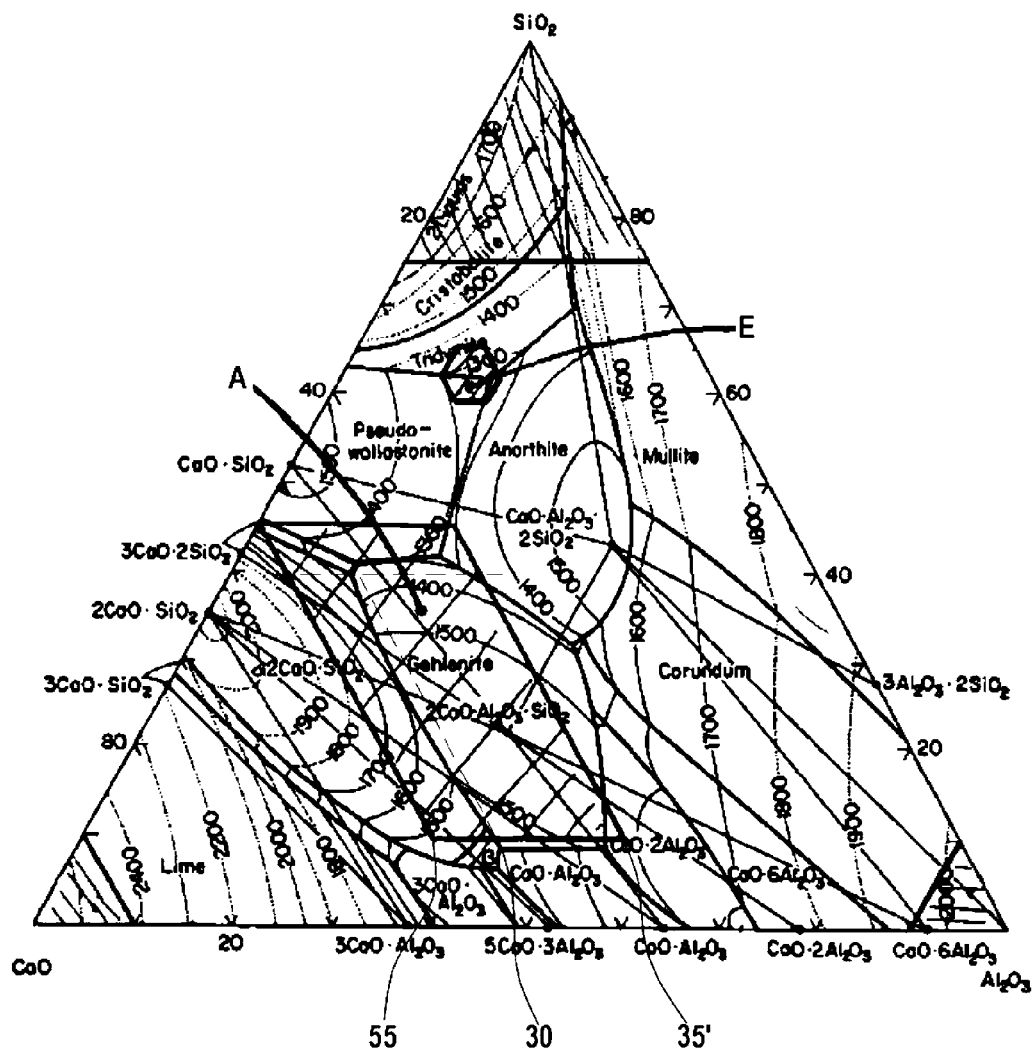

The treated wastes (limestone soil, concrete, sludge) in Examples 1 to 9 hereafter, essentially consist of calcium carbonate ($CaCO_3$), silica ($SiO_2$), alumina ($Al_2O_3$) and hematite ($Fe_2O_3$). In the following tables, the average compositions of the wastes are indicated in a first table, and then in a second table the mass percentages of the wastes $P_C$, $P_S$ and $P_X$, in a $CaO/SiO_2/X_2O_3$ ternary diagram system, as defined earlier, after calcination and application, if necessary, of a hematite/alumina equivalence coefficient explained later on.

1/ Soil

|  | Components | | | | | |
|---|---|---|---|---|---|---|
|  | $CaCO_3$ | $SiO_2$ | $Al_2O_3$ | $Fe_2O_3$ | Other minerals | Humidity and organics |
| Soil mass % | 67.5 | 17 | 4.5 | 1.3 | 1.7 | 8 |
|  | CaO | | $SiO_2$ | | $X_2O_3$ | |
|  | $P_c$ = 63.3% | | $P_S$ = 28.6% | | $P_X$ = 8.1% | |

2/ Concrete

|  | Components | | | | | |
|---|---|---|---|---|---|---|
|  | CaO | $Al_2O_3$ | $Fe_2O_3$ | $SiO_2$ | Other minerals | Humidity and organics |
| Concrete mass % | 58.9 | 3 | 0.4 | 30.1 | 1.6 | 6 |
|  | CaO | | $SiO_2$ | | $X_2O_3$ | |
|  | $P_C$ = 53.9% | | $P_S$ = 41.7% | | $P_X$ = 4.4% | |

3/ Mud

| Components | $CaCO_3$ | $SiO_2$ | $Al_2O_3$ | $Fe_2O_3$ |
|---|---|---|---|---|
| Mud mass % | 35 | 33 | 6 | 26 |
|  | CaO | $SiO_2$ | | $X_2O_3$ |
|  | $P_c$ = 30% | $P_S$ = 50% | | $P_X$ = 20% |

B—PRINCIPLE OF THE CALCULATION OF PROPORTIONS

B.1—Effect of Calcination

Let a waste originally consist of:

|  | Component | | | | |
|---|---|---|---|---|---|
|  | $CaCO_3$ | $SiO_2$ | $Al_2O_3$ | Other minerals | Humidity and organics |
| Mass Percentage | $P'_C$ | $P'_S$ | $P'_A$ | $P'_X$ | $P'_O$ |

By definition: $P'_C + P'_S + P'_A + P'_X + P'_O = 100$

The calcination has the effects of vaporizing humidity, burning the organic materials, and transforming carbonates ($CaCO_3$) into lime (CaO):

$$CaCO_3 \rightarrow CaO + CO_2$$

If an initial sample of 100 g is considered, the $P'_C$ grams of $CaCO_3$ become $P'_C/1.78$ gram of lime (1.78=ratio of the molar mass of the carbonate to that of the lime), and the $P'_O$ grams of humidity and of organics will have disappeared.

Molar masses of CaO, $SiO_2$, $Al_2O_3$, $B_2O_3$ et $Fe_2O_3$ are the following: 1 mole of CaO=56.1 g, 1 mole of $SiO_2$=60.1 g, 1 mole of $Al_2O_3$=102 g, 1 mole of $B_2O_3$=69.6 g and 1 mole of $Fe_2O_3$=159.7 g.

The mass of the calcined sample, $M_1$, is therefore written as:

$$M_1 = \frac{P'_C}{1.78} + P'_S + P'_A + P'_X.$$

And the mass percentages of the constituents of the calcined waste are written as:

| Components | CaO | $SiO_2$ | $Al_2O_3$ | Other minerals | Humidity and organics |
|---|---|---|---|---|---|
| Mass percentage | $P_{C1} = \dfrac{100 \cdot P'_C}{1.78 \cdot M_1}$ | $P_{S1} = \dfrac{100 \cdot P'_S}{M_1}$ | $P_{A1} = \dfrac{100 \cdot P'_A}{M_1}$ | $P_{X1} = \dfrac{100 \cdot P'_X}{M_1}$ | 0 |

In this way, we have:

$$P_{C1}+P_{S1}+P_{A1}+P_{X1}=100$$

The quick lime (CaO) may also be obtained by calcination of gypsum (CaSO$_4$(H$_2$O)$_2$) or of slaked lime (Ca(OH)$_2$). The molecular mass ratios are then of 3.07 and 1.32 respectively, rather than 1.78 for carbonate.

B.2—Percentages of the CAS Diagram

In order to locate the composition of the waste in the CAS diagram, the calcined waste is considered and only lime, alumina and silica are taken into account.

In the $M_1$ grams of calcined waste from paragraph B.1—, only a portion $M_2$ is taken into account, written as:

$$M_2 = \frac{P'_C}{1.78} + P'_S + P'_A$$

And the mass percentages in the CAS diagram are written as:

| Component | CaO | SiO$_2$ | Al$_2$O$_3$ |
|---|---|---|---|
| Mass percentage | $P_C = \frac{100 \cdot P_C}{1.78 \cdot M_2}$ | $P_S = \frac{100 \cdot P_S}{M_2}$ | $P_A = \frac{100 \cdot P_A}{M_2}$ |

In this way, one has:

$$P_C+P_S+P_A=100$$

B.3—Examples of Calculations of the Proportions

The mass percentage proportions for the soil, used in the examples, are the following:

| | Component | | | | |
|---|---|---|---|---|---|
| | CaCO$_3$/CaO | SiO$_2$ | Al$_2$O$_3$ | Other minerals | Humidity and organics |
| Crude soil composition | 67.5 | 17 | 4.5 | 3 | 8 |
| After calcination | 60.7 | 27.3 | 7.2 | 4.8 | 0 |
| CAS percentages | 63.8 | 28.6 | 7.6 | — | — |

The mass percentage proportions for concrete, other than the one used in the examples but which was tested, were the following:

| | Component | | | | |
|---|---|---|---|---|---|
| | CaCO$_3$/CaO | SiO$_2$ | Al$_2$O$_3$ | Other minerals | Humidity and organics |
| Crude concrete composition | 80.7 | 15.1 | 1.8 | 2.4 | 0 |
| After calcination | 70.1 | 23.4 | 2.8 | 3.7 | 0 |
| CAS percentages | 72.8 | 24.3 | 2.9 | — | — |

B.4—Alumina Equivalence Coefficient for Hematite and Boron Oxide

Initially, the soil and the concrete were treated by exclusively adding alumina alone.

Then, the replacement of alumina with other trivalent oxides, i.e. Fe$_2$O$_3$ and B$_2$O$_3$, was tested.

It was seen that the alumina may be totally or partly substituted with hematite or boric anhydride or with precursors which transform into these molecules during calcination, so as to retain a similarity between the properties of the different oxides used, by recording in the final mixture, a total alumina mass equal to the actual alumina mass to which is added 0.28 time the mass of hematite and 2 times the mass of boric anhydride.

These equivalence coefficients, 0.28 and 2 do not simply result from an empirical observation, but were determined from the comparison of lime/hematite/silica and lime/boric anhydride/silica ternary diagrams with the CAS diagram.

Figure 4:
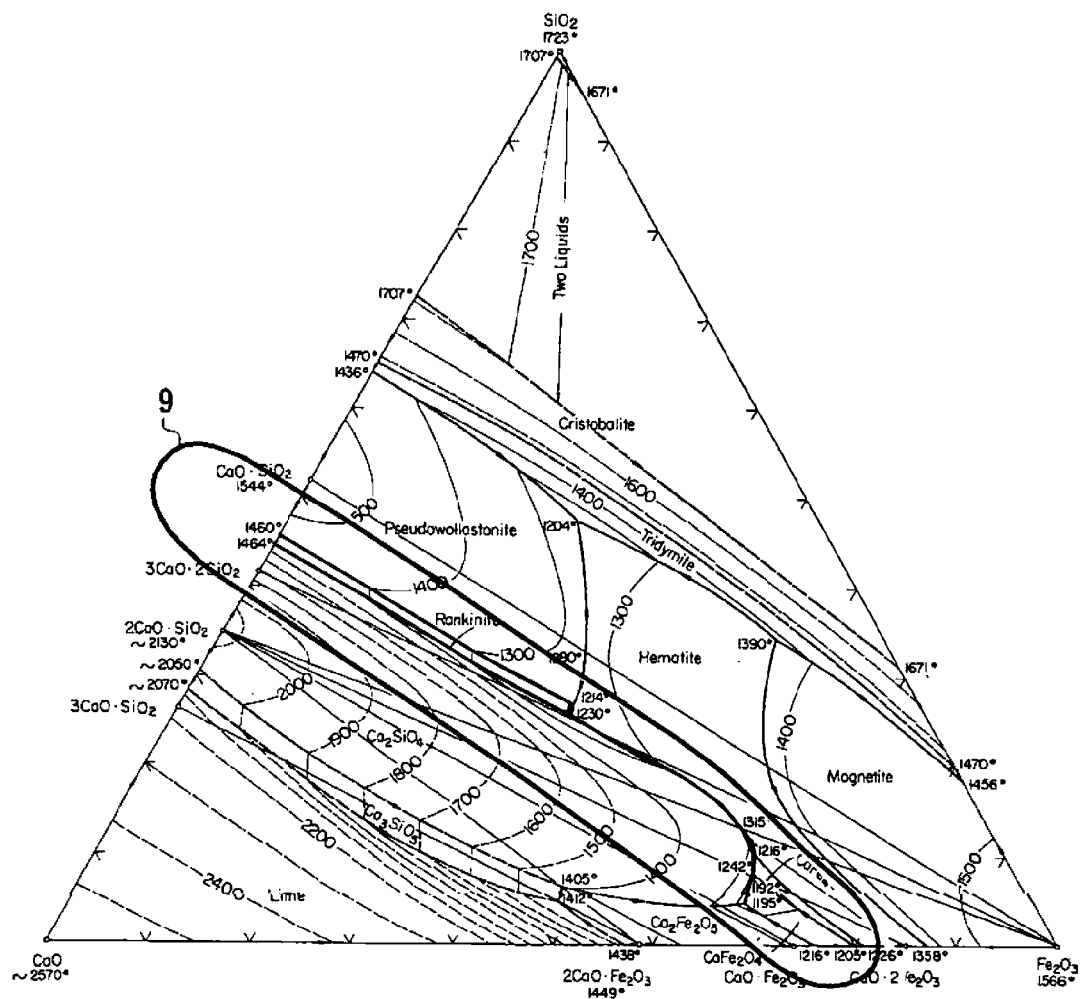
FIG. 4 illustrates the lime/hematite/silica ternary diagram.
Figure 5:
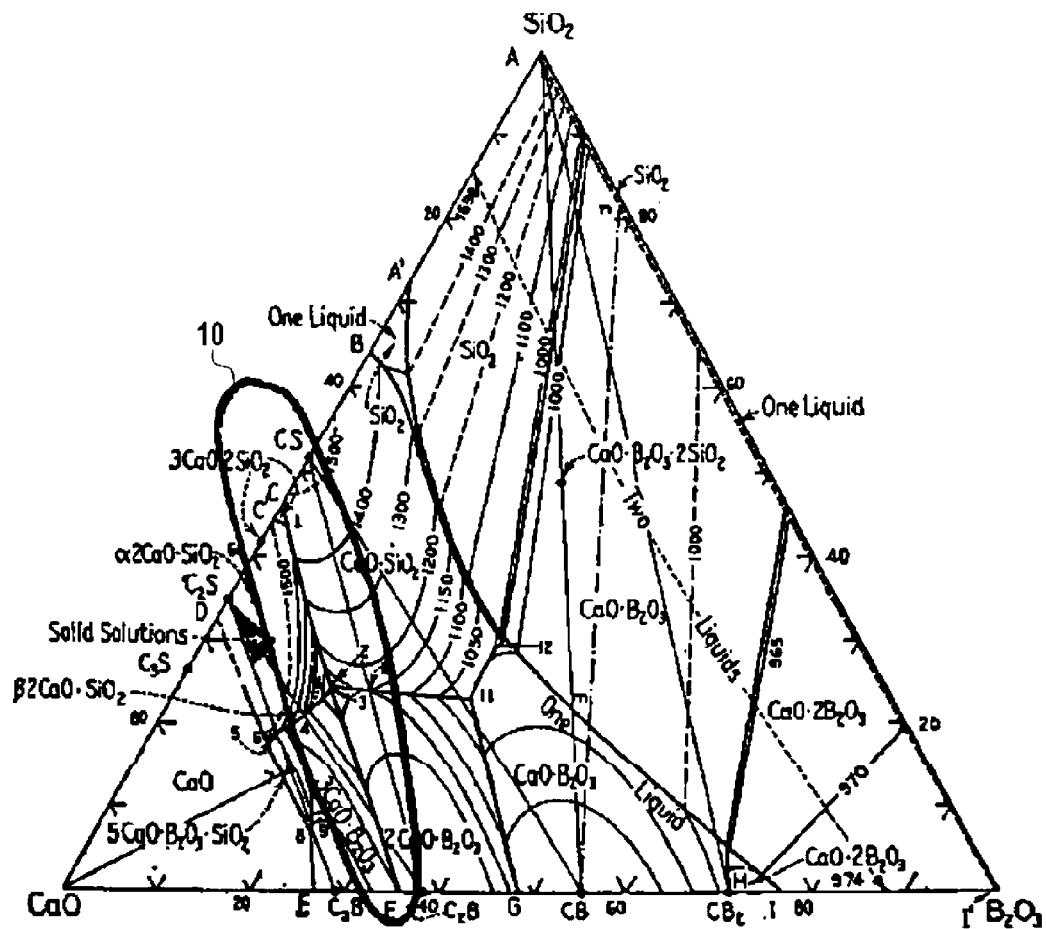
FIG. 5 illustrates the lime/boric anhydride/silica ternary diagram.
Figure 6A:
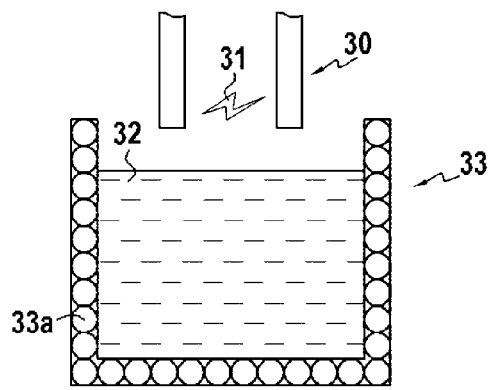
FIGS. 6A to 6D illustrate different steps of the heating method in a cooled crucible.
Figure 6B:
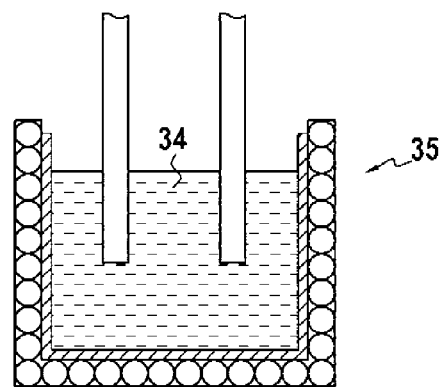
Figure 6C:
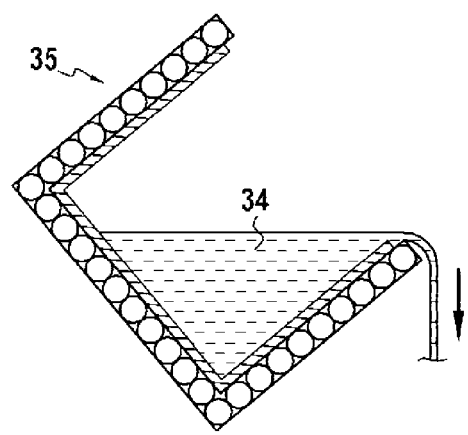
Figure 6D:
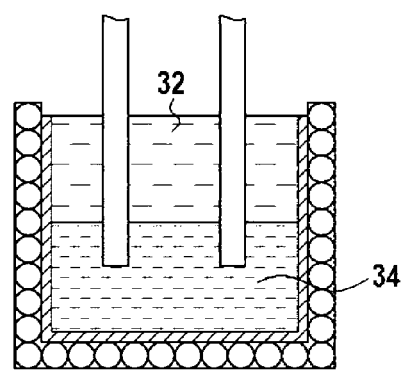
Figure 8:
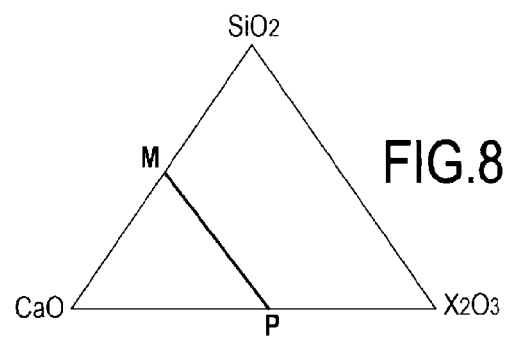
FIG. 8 illustrates a CXS ternary diagram.

On the three diagrams, it is actually observed that a relatively rectilinear set of eutectic valleys (A (FIG. 1) and 9-10 (FIGS. 4-5)) joins the point M of the CaO—SiO$_2$ line to a point P of the CaO—X$_2$O$_3$ (wherein X$_2$O$_3$ is the trivalent oxide), as schematized in FIG. 8.

The position of the point M does not depend on the nature of the trivalent oxide, and is located in the domain of rankinite. A comparison of the positions of the point P for the different trivalent oxides allows determination of these equivalence coefficients.

As for the case of alumina, if the composition is unbalanced so as to deviate from the eutectic, the melting temperature rapidly increases on the left of the valley (excess lime) and gently on the right of the valley (lime shortage).

The position of the point P defines $p_x$, $p_x$ being the X$_2$O$_3$ mass percentage in a binary mixture CaO—X$_2$O$_3$. These $p_x$ values were determined graphically on ternary diagrams, by taking an approximate middle point when the eutectic valleys branch towards the CaO/X$_2$O$_3$ line (case of X=Fe et X=Al):

| Trivalent oxide | Al$_2$O$_3$ | Fe$_2$O$_3$ | B$_2$O$_3$ |
|---|---|---|---|
| % $p_x$ | 53 | 80 | 36 |

The equivalence coefficients are defined in such a way that by recording, in a binary or ternary mixture, the mass of X$_2$O$_3$ by the actual mass multiplied by this equivalence coefficient, the point P of the CXS diagram is superposed to the point P of the CAS diagram.

In the following:
- $p_x$ is the actual mass proportion of the trivalent oxide X$_2$O$_3$ in the CaO/X$_2$O$_3$ mixture corresponding to the position of point P in the CXS diagram,
- $p_A$ is the actual mass proportion of Al$_2$O$_3$ in the CaO/Al$_2$O$_3$ mixture corresponding to the position of point P in the CAS diagram,
- $k_x$ is the equivalent coefficient.

1 gram of binary mixture, corresponding to P, contains $p_x$ grams of X$_2$O$_3$ et $(1-p_x)$ grams of CaO.

By applying the equivalence coefficient, this mixture is supposed to be equivalent to a mixture of k·$p_x$ grams of Al$_2$O$_3$ and $(1-p_x)$ grams of CaO.

The proportions in this equivalent mixture are $$\frac{k \cdot p_x}{k \cdot p_x + 1 - p_x}$$

of $Al_2O_3$ and $$\frac{1-p_x}{k \cdot p_x + 1 - p_x}$$

of CaO.

k is sought in such a way that the proportion of $Al_2O_3$ is equal to $p_A$:

$$\frac{k \cdot p_x}{k \cdot p_x + 1 - p_x} = p_A \Leftrightarrow k = \frac{p_A \cdot (1-p_X)}{p_X \cdot (1-p_A)}$$

The thereby determined equivalence coefficients are 2 for $B_2O_3$ and 0.28 for $Fe_2O_3$. The experimental data have validated these equivalence coefficients.

C—PROCEDURE OF EXAMPLES 1 TO 12

The method for packaging toxic waste in an artificial rock, a glass or a vitrocrystalline solid comprised the successive steps of:
 analyzing the waste(s),
 adjusting the composition by adding additives, so that the final composition is in the target domain,
 if necessary, mixing the wastes so as to enter the starting domain as defined above,
 when the final composition comprises more than 10% of boric acid, separately calcining the components which may decompose at a temperature above 300° C.,
 melting the whole at a temperature comprised between 1,250 and 1,650° C. (temperatures below 1,550° C. being obtained with boron oxide concentrations of more than 3%)
 casting the molten liquid in a lost or reusable ingot mold,
 obtaining a monolith after cooling without annealing, within a few hours to 15 days, depending on the size of the monolith.

For the laboratory tests of Examples 1 to 9, the wastes to be treated were heated in a sacrificial crucible in alumina, placed in an oven, this crucible allowing automatic adjustment of the composition of the final waste.

On the other hand, for the industrial tests of Examples 10 to 12, heating was carried out by the Joule effect, with graphite electrodes immersed in a crucible based on graphite. A crucible in any other refractory material and inert towards the produced lavas may be used.

This heating technique via the Joule effect is preferred to the heating technique with the plasma torch since a significant amount of wastes has to be melted, with an industrial objective of robustness and throughput.

In the diagram of FIGS. 6A to 6D, the graphite electrodes 30 (FIG. 6A) (usually 3 in number) heat the solid material 32 by radiation from an arc 31 between the electrodes, and are then immersed in the pool 34 (FIG. 6B) in order to sustain the melting via the Joule effect. Depending on the material forming the initial waste, it is also possible to begin heating by immersing the electrodes in the load. The electrodes are motorized so that they be raised or lowered.

As the Joule effect is more efficient than radiative heating, it is interesting to operate semi-continuously with a pool of a larger volume than that of the ingot 26 (FIG. 7), so as to always keep a melt in the crucible 33. The cooled crucible 33 consists of joined pipes 33a which delimit a cavity. Water is circulated in the pipes so that the outermost layer of the waste solidifies. The thereby generated solid layer 35 protects the crucible from corrosion. The electrodes 30 are gradually consumed. This consumption represents at most 1% of the mass of the treated waste, and therefore does not significantly reduce the incorporation rate. This oven principle is used industrially for melting metals and for producing ceramics. The principle of heating with an arc and with the Joule effect is also known.

Figure 7:
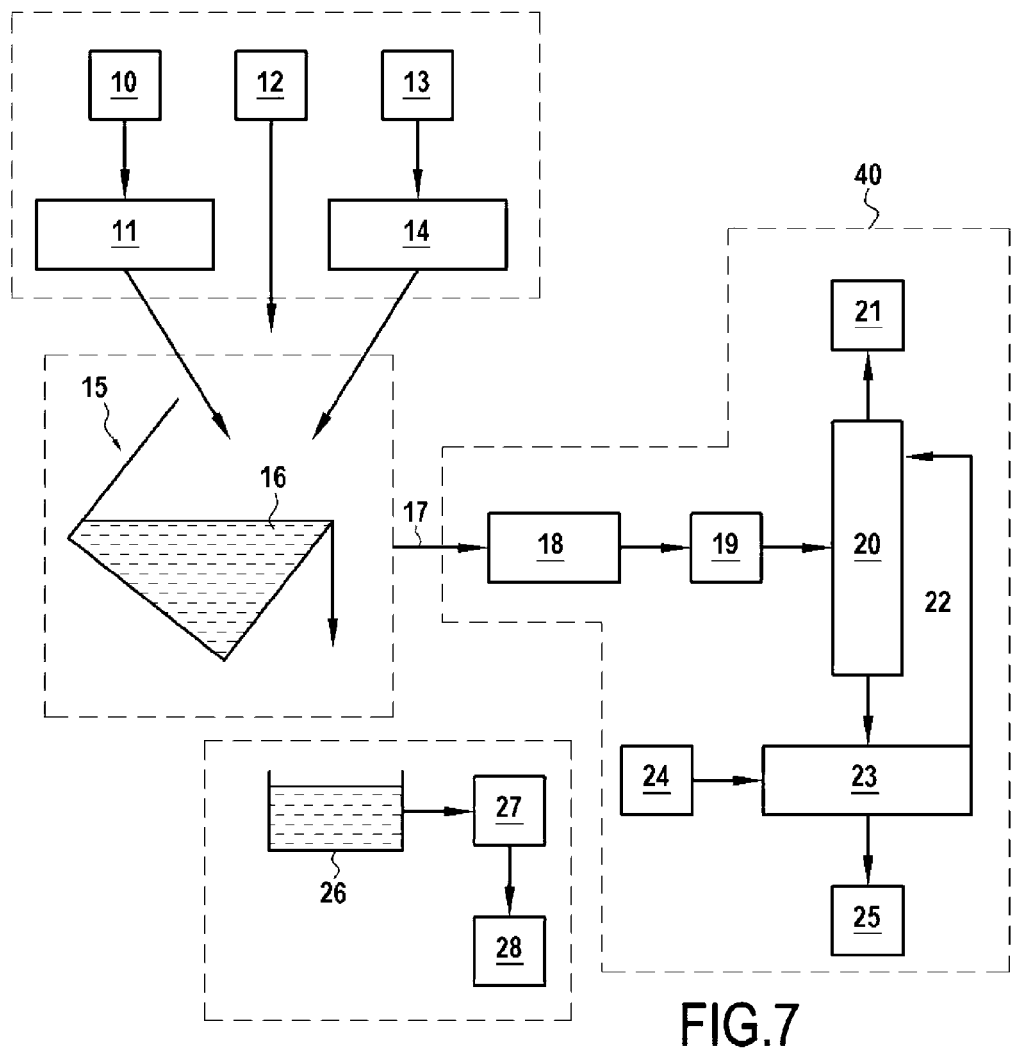
FIG. 7 illustrates a diagram of a facility for applying the method according to the invention.

In FIG. 7, an installation is illustrated with upstream equipment and downstream equipment of the oven 15.

Before injecting the wastes 10 into the oven 15, it is necessary:
 to dry them 14, if need be,
 to mill them 11, if required, in order to obtain a grain size of less than 5 cm, typically. In certain cases, notably that of contaminated soil, it may be economically of interest to separate the big pieces in order to discharge them as a VWA (very weakly active) waste, a category below WA/MA, and less expensive,
 to carry out the mixing with the adjuvants 12.

The upstream equipment comprises ingot molds 26 and premises 27 for the cooling. The premises 27 should be dimensioned depending on the flow of treated waste and on the cooling time, a maximum of one week.

The preferred final packaging method is the metal barrel as a "lost" ingot mold. The melt is directly cast into the barrel. The barrel is buried in alumina sand in order to limit the cooling rate. After cooling, the loading of the barrel is completed by mortar 28 if necessary, the barrel is painted and closed and then evacuated. The most active wastes are conditioned in other packages such as concrete boxes or shells. In this case, the melt is cast into ingot molds with suitable dimensions and shapes for the final packaging, so as not to leave any voids. The ingots 26 are removed from the mold a few minutes after the casting, and like the barrels, they are buried in alumina sand for cooling.

Depending on the nature of the waste, the fumes 17 contain, in addition to nitrogen and oxygen, water, $CO_2$, CO, VOCs (volatile organic compounds), $SO_x$, $NO_x$ and dusts. The radioactivity, except for very particular cases, (tritium and $^{14}C$), is borne by the dust and partly in the form of a gas (iodine, cesium and ruthenium isotopes). A strong VOC and CO content (from a strong content of organic products in the waste) would require post-combustion (not illustrated in the diagram).

The following step is cooling 18 of the fumes to less than 200° C., so that the gaseous radio-elements (cesium, ruthenium) again pass into a particulate form, and are trapped in the particle filter 19.

In the absence of particular radio-elements (tritium, $^{14}C$, iodines), the gas after filtration 19 may be considered as non-radioactive. It undergoes washing with water 22 in a washing column 20 to destroy the $NO_x$ and the $SO_x$. The gas 21 is monitored and then discharged into the atmosphere.

Full destruction of the NO requires a particular device, as a supplement, known in the industry, in which these NO gases are reduced to dinitrogen by ammonia.

When the gas washing solution is saturated, it is evaporated and crystallized. The steam 22 is condensed so as to be reused as a washing solution. The salts 23 25 (nitrates, sulfates, carbonates) form a waste material which, according to the regulations and to the nature of the radioactivity of the incoming waste, will be considered as special industrial waste or a VWA radioactive waste.

For practical reasons, certain conducted tests were made in a sacrificial crucible in alumina, the melt then incorporates the alumina of the crucible, until it finds equilibrium at the temperature which is imposed to it.

Moreover, crude products (earth and concrete) are very heterogeneous, which makes the determination of their composition difficult. Therefore, additionally, analyses of the calcined products were also conducted, by checking the independently determined ignition loss factors, by thermogravimetric analysis.

The tests of Examples 1 to 9 were conducted at a small scale (100 g), the samples having been finely milled (a grain size of less than 1 cm). Other tests on Examples 1 to 9 were conducted on a larger scale (2 kg), with a grain size attaining 1 cm. The tests of Examples 10 to 12 were carried out at an industrial scale (200 kg per casting). At this scale, a grain size which may attain 5 cm or even 10 cm, may be tolerated.

D—EXAMPLES 1 TO 9

In Examples 1 to 9, the target was a target domain defined around the eutectic valley separating gehlanite ($Ca_2Al_2SiO_7$) from larnite ($Ca_2SiO_4$) in the CAS diagram, with:

50%>$P_C$>35%, and
40%>$P_S$>20%.

The thermodynamic melting temperatures in this valley range from a little less than 1,400° C. to a little more than 1,500° C. in the CAS diagram.

In the tables of the following Examples 1 to 12, the compositions of the crude starting products and of the products after calcination are in mass percentages, with:

(1)=$CaCO_3$ for the crude soil, CaO for the calcined product
(2)=$Al_2O_3$ for lines 1 and 3 of the tables
(3)=$X_2O_3$ ($Al_2O_3$ equivalent proportion) for the last line "CXS proportions" in a ternary system $P_C+P_S+P_X=100\%$ In the tables of the following Examples 1 to 9, in the "CXS proportions" line, the values of $P_C$, $P_X$, $P_S$, are given in the $CaCO_3$/CaO, $Al_2O_3$/$X_2O_3$, $Fe_2O_3$ and $SiO_2$ columns, respectively, as defined above with:

$P_C+P_S+P_X=100\%$, and
$P_X=P_A+P_B+P_H$.

The incorporation rate of a given waste material is the volume of the obtained monolith divided by the volume of said material.

In the last column of the tables, the term of "orga" means "organic compounds".

Example 1

FIG. 2

| Soil + 20% of alumina (reference 4, FIG. 2) | | | | | |
|---|---|---|---|---|---|
| Component | | | | | |
| $CaCO_3$ CaO (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (mass % of the crude) | | 20 | | | | |
| Calcined soil composition (%) | 46.1 | 29.8 | 1.6 | 20.8 | 1.7 | — |

-continued

| Soil + 20% of alumina (reference 4, FIG. 2) | | | | | |
|---|---|---|---|---|---|
| Component | | | | | |
| $CaCO_3$ CaO (1) | $Al_2O_3$ (2) $X_2O_3$ (3) | $Fe_2O_3$ | $SiO_2$ | Other minerals | $H_2O$ and orga. |
| Calcined soil CXS proportions (%) | 47.5 | 31.1 | | 21.4 | — | — |
| Melting temperature (° C., observed) | | | | | | 1620 |
| Soil incorporation rate (the added alumina is a fresh product) | | | | | | 3.0 |
| Incorporation rate of the soils + $Al_2O_3$ (the added alumina is from radioactive waste) | | | | | | 3.6 |

The composition adjustment was automatic, by digestion of the alumina crucible. The composition of the calcined product is on the gehlenite/larnite eutectic valley (see FIG. 2, reference 4).

It was seen, during the following tests on the soil with additional alumina and hematite, or with addition of alumina and boric anhydride, that the alumina equivalent proportion ($X_2O_3$ in the CXS mixture) remains close to this equilibrium proportion (31.1%), which experimentally justifies the notion of equivalence to alumina.

Example 2

FIG. 2

| Soil + 35% of alumina (reference 5, FIG. 2) | | | | | |
|---|---|---|---|---|---|
| Component | | | | | |
| $CaCO_3$ CaO (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (crude mass %) | | 35 | | | | |
| Calcined soil composition (%) | 39.0 | 40.6 | 1.4 | 17.6 | 1.4 | — |
| Calcined soil CXS proportions (%) | 39.9 | 42.0 | | 18.0 | — | — |
| Melting temperature (° C., observed) | | | | | | 1600 |
| Soil incorporation rate (the added alumina is a fresh product) | | | | | | 3.0 |
| Incorporation rate of soils + $Al_2O_3$ (the added alumina is from a radioactive waste) | | | | | | 3.6 |

Many tests were conducted around this composition, in order to avoid corrosion of the crucible. The composition of the calcined material is approximately in the middle of the gehlenite domain. The eutectic valley has a not very sloped flank, when one leaves this valley in order to progress into the gehlenite domain. The theoretical melting temperature does not increase significantly.

On the other hand, excess alumina reduces viscosity, which reduces the actual melting temperature.

Example 3

Figure 2:
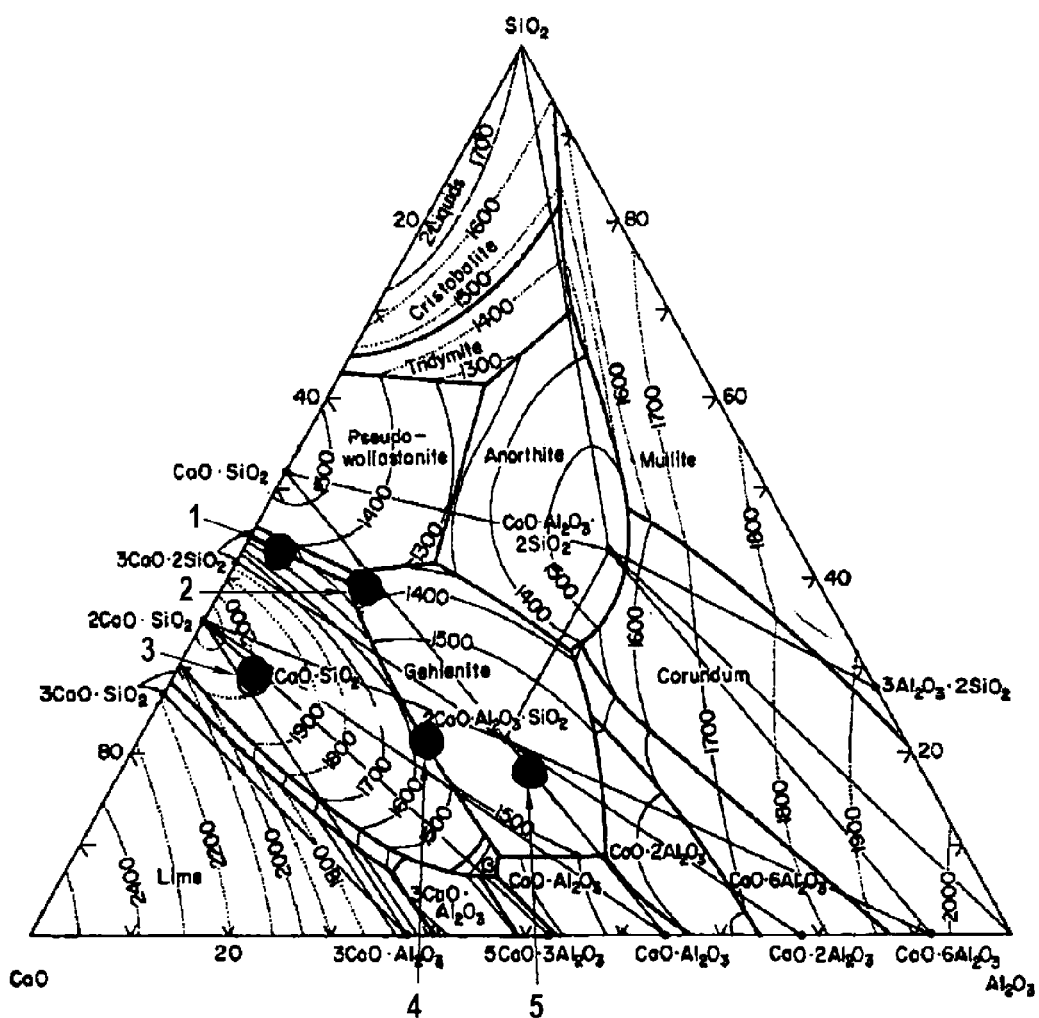

Concrete + 10% of alumina (reference 2, FIG. 2)

| | Component | | | | | |
|---|---|---|---|---|---|---|
| | CaO (1) | $Al_2O_3$ (2) $X_2O_3$ (3) | $Fe_2O_3$ | $SiO_2$ | Other minerals | $H_2O$ and orga. |
| Crude concrete composition (%) | 58.9 | 3.0 | 0.4 | 30.1 | 1.6 | 6.0 |
| Addition (crude mass %) | | 10 | | | | |
| Calcined concrete composition (%) | 46.3 | 15.5 | 0.5 | 35.8 | 1.9 | — |
| Calcined concrete CXS proportions (%) | 47.4 | 16.0 | | 36.6 | — | — |
| Melting temperature (° C., observed) | | | | | | 1620 |
| Incorporation rate of the soil (the added alumina is a fresh product) | | | | | | 4.0 |
| Incorporation rate of soil + $Al_2O_3$ (the added alumina is from a radioactive waste) | | | | | | 4.3 |

(1): as regards crude concrete, this is in fact a mixture of more or less hydrated lime (CaO($H_2O$)n) and of carbonate ($CaCO_3$).

The composition of the crude concrete (reference 1, FIG. 2) is close to the domain of rankinite. The composition of the calcined concrete (reference 2, FIG. 2) is close to the intersection between the four domains: rankinite, pseudo-wollastonite, gehlenite, larnite.

Example 4

Soil + 20% of alumina + 20% of hematite

| | Component | | | | | |
|---|---|---|---|---|---|---|
| | $CaCO_3$ CaO (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (crude mass %) | | 20 | 20 | | | |
| Calcined soil composition (%) | 37.1 | 24.0 | 20.9 | 16.7 | 1.4 | — |
| Calcined soil CXS proportions (%) | 44.3 | 35.7 | 20.0 | | — | — |
| Melting temperature (° C., observed) | | | | | | 1550 |
| Incorporation rate of soil (the added alumina and hematite are fresh products) | | | | | | 2.4 |
| Incorporation rate of soil + $Fe_2O_3$ (the added alumina is a fresh product) | | | | | | 2.7 |
| Incorporation rate of soil + $Al_2O_3$ (the additions are from radioactive wastes) | | | | | | 3.2 |

Example 5

Soil + 10% of alumina + 30% of hematite

| | Component | | | | | |
|---|---|---|---|---|---|---|
| | $CaCO_3$ CaO (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (crude mass %) | | 10 | 30 | | | |
| Calcined soil composition (%) | 37.1 | 14.2 | 30.7 | 16.7 | 1.4 | — |
| Calcined soil CXS proportions (%) | 48.4 | 29.8 | | 21.8 | — | — |
| Melting temperature (° C., observed) | | | | | | 1510 |
| Incorporation rate of soil (the added alumina and hematite are fresh products) | | | | | | 2.4 |
| Incorporation rate of soil + $Fe_2O_3$ (the added alumina is a fresh product) | | | | | | 2.8 |
| Incorporation rate of soil + $Al_2O_3$ + $Fe_2O_3$ (the additions stem from radioactive wastes) | | | | | | 3.1 |

Example 6

Soil + 15% of alumina + 2.5% boric anhydride

| | Component | | | | | | |
|---|---|---|---|---|---|---|---|
| | $CaCO_3$ CaO (1) | $Al_2O_3$ (2) $X_2O_3$ (3) | $Fe_2O_3$ | $B_2O_3$ | $SiO_2$ | Other minerals | $H_2O$ and orga. |
| Crude soil composition | 67.5 | 4.5 | 1.3 | | 17.1 | 1.4 | 8.2 |

Soil + 15% of alumina + 2.5% boric anhydride

| | CaCO$_3$ CaO (1) | Al$_2$O$_3$ (2) X$_2$O$_3$ (3) | Fe$_2$O$_3$ | B$_2$O$_3$ | SiO$_2$ | Other minerals | H$_2$O and orga. |
|---|---|---|---|---|---|---|---|
| (%) Additional (crude mass %) | | 15 | | 2.5 | | | |
| Calcined soil composition (%) | 47.5 | 24.5 | 1.7 | 3.1 | 21.5 | 1.8 | — |
| Calcined soil CXS proportions (%) | 47.4 | 31.1 | | | 21.4 | — | — |
| Melting temperature (° C., observed) | | | | | | | 1550 |
| Incorporation rate of soil (the added alumina and hematite are fresh products) | | | | | | | 3.1 |
| Incorporation rate of soil + B$_2$O$_3$ (the added alumina is a fresh product) | | | | | | | 3.2 |
| Incorporation rate of the earth + Al$_2$O$_3$ + B$_2$O$_3$ (the additions stem from radioactive wastes) | | | | | | | 3.7 |

Example 7

Soil + 10% boric anhydride

| | CaCO$_3$ CaO (1) | Al$_2$O$_3$ (2) X$_2$O$_3$ (3) | Fe$_2$O$_3$ | B$_2$O$_3$ | SiO$_2$ | Other minerals | H$_2$O and orga. |
|---|---|---|---|---|---|---|---|
| Crude soil composition (%) | 67.5 | 4.5 | 1.3 | | 17.1 | 1.4 | 8.2 |
| Addition (crude mass %) | | | | 10 | | | |
| Calcined soil composition (%) | 52.5 | 6.2 | 1.8 | 13.9 | 23.7 | 1.9 | — |
| Calcined soil CXS proportions (%) | 47.4 | 31.2 | | | 21.4 | — | — |
| Melting temperature (° C., observed) | | | | | | | 1250 |
| Incorporation rate of soil (the added B$_2$O$_3$ is a fresh product) | | | | | | | 3.4 |
| Incorporation rate of soil + B$_2$O$_3$ (B$_2$O$_3$ stems from a radioactive waste) | | | | | | | 3.8 |

The very low melting temperature will be noted. This mixture is the most concentrated in boron, which does not produce any foam.

The incorporation of boron oxide being in amounts above 5%, in order to avoid or reduce the production of foam, the carbonates have to be calcined before incorporating boron oxide, either sequentially in a single oven, or by using an oven dedicated to calcinations (around 950° C.).

Example 8

FIG. 3

50% of soil + 50% of sludge (simulated sludge)

| | Component | | | | | |
|---|---|---|---|---|---|---|
| | $CaCO_3$ $CaO$ (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (crude sludge mass %) | 35 | 6 | 26 | 33 | | |
| Calcined mixture composition (%) | 39.2 | 7.1 | 18.6 | 34.1 | 1.0 | — |
| Calcined mixture CXS proportions (%) | 45.7 | 14.5 | | 39.8 | — | — |
| Melting temperature (° C., observed) | | | | | | 1400 |
| Soil incorporation rate | | | | | | 1.7 |
| Incorporation rate of soil + sludge | | | | | | 3.5 |

Figure 3:
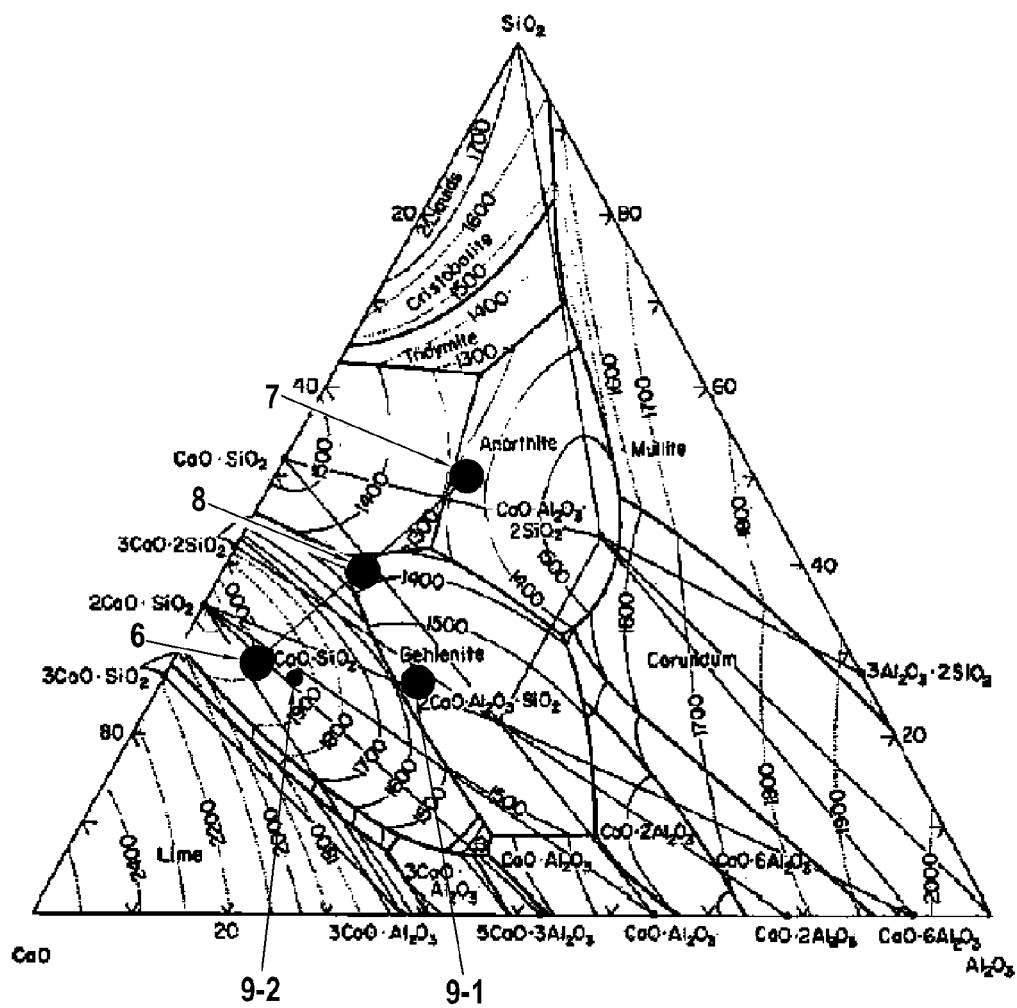

The composition of crude soil is shown in reference 6, FIG. 3 and that of crude sludge in reference 7, FIG. 3.

It is seen that the composition of the 50/50 sludge and calcined soil mixture (reference 8, FIG. 3) enters the target domain defined above.

Example 9

Fine fraction of the soil: grain size of less than 1 cm (50% of the initial mass)

| | Component | | | | | |
|---|---|---|---|---|---|---|
| | $CaCO_3$ $CaO$ (1) | $Al_2O_3$ (2) $X_2O_3$ (3) | $Fe_2O_3$ | $SiO_2$ | Other minerals | $H_2O$ and orga. |
| Crude soil composition (%) | 67.5 | 4.5 | 1.3 | 17.1 | 1.4 | 8.2 |
| Addition (crude soil mass %) | −41.7 | −1.3 | −0.4 | −5.9 | −0.7 | |
| Composition of the calcined mixture (%) | 47.7 | 10.3 | 3.1 | 36.8 | 2.4 | — |
| Calcined mixture CXS proportions (%) | 49.8 | 11.7 | | 38.5 | — | — |
| Melting temperature (° C., observed) | | | | | | 1530 |
| Incorporation rate | | | | | | 8.1 |

The "additions" are negative because a portion of the initial material was removed.

The very high incorporation rate (8.1) results from the fact that large particles assumed to be VWA particles, represent a negligible waste cost relatively to the final WA product.

The CXS proportions of the final product are very close to those corresponding to concrete+10% Al (reference 2, FIG. 2) and to the calcined 50/50 soil/sludge mixture (reference 8, FIG. 3).

E—ANALYSES OF THE RESULTS OF EXAMPLES 1 TO 9

The above tests show that the concerted addition of alumina in order to reach the eutectic valley separating gehlenite ($Ca_2Al_2SiO_7$) from larnite ($Ca_2SiO_4$) in the CAS (lime, alumina, silica) ternary diagram, reduces both the melting temperature and the corrosivity of the melt.

The conducted tests show that the regions of the selected eutectic valleys have interesting characteristics for melting the wastes: an actual reasonable melting temperature (below 1,650° C.) and low viscosity of the pool. The low viscosity is ascribed to the strong proportion of lime. This low viscosity reduces the difference between the actual melting temperature and the thermodynamic melting temperature. The difference observed on soil+alumina is 70° C., the one observed on concrete+alumina (a lower lime content) is 270° C. As a comparison, for a glass E (FIG. 1) as targeted in FR 2 741 552, the difference may exceed 500° C., which strongly reduces the benefit of working around the low point of the CAS diagram (1,170° C.).

The tests have demonstrated that 50% of the cesium initially present in the waste remains captured in the monolith obtained according to the present invention, even with melting temperatures of 1,650° C.

Moreover, the low viscosity allows rapid homogenization of the molten glass, which facilitates cooling of the monolith.

According to the present invention, monolithic blocks of several kilograms are obtained with cooling for a few hours, without any crack, or, a fortiori any breaking up. Tests were conducted at an industrial scale (a monolith of 500 kg), with a cooling period of only 24 hours.

A polycrystalline solid rather than a glass is preferably obtained. A polycrystalline solid or artificial rock is more likely not to crack in spite of rapid cooling. The conditions for obtaining such a condition of the final product are a composition slightly away from the eutectic, preferably in the domain of gehlenite, and a controlled cooling rate down to 1,000° C.

Indeed, in order to obtain a polycrystalline material, a close composition must be targeted on the one hand, but different from the eutectic, the cooling rate must be reduced around the crystallization temperature on the other hand. It is easier to place the target in the domain of gehlenite (an excess of alumina in the earth) than in that of larnite (lack of alumina in the earth). Indeed, the melting temperature increases very rapidly when moving away from the eutectic in order to enter the domain of larnite, while it increases very slowly in the domain of gehlenite.

A glass is less favorable than a polycrystalline solid, but it may also be contemplated taking into account the good homogeneity of the pool. The cooling time then has to be increased (one week).

The tests have shown that a poorly balanced melt i.e. the composition of which is too far away from an eutectic, is highly in need for alumina. Coupled with low viscosity, this characteristic allows self-adjustment of the composition. It is sufficient to use a sacrificial crucible or alumina blocks in the pool so that the composition adjusts by itself to that of the closest eutectic valley, within a few minutes, by the composition of the crucible.

It was observed that the crystallization of the target material occurs during cooling between 1,250 and 1,000° C. A relatively low cooling rate down to 1,000° C. (of the order of one hour) triggers crystallization. Once crystallized the material withstands highly rapid cooling (within less than 24 hours) down to room temperature, without developing any cracks.

The desired cooling profile is obtained by burying the freshly cast ingot into a bed of powdered alumina (or another refractory material having similar heat conductivity) and by letting the assembly cool naturally in premises at room temperature for a few hours. Below 1,000° C., the cooling may be accelerated by extracting the ingot from its alumina bed (air quenching), or even by quenching it in water. A glass should be left in its alumina bed during the whole cooling period.

The addition of non-radioactive alumina purchased commercially, with the purpose of adjusting the composition, degrades the incorporation rate. It is therefore preferable to adjust the composition by mixing radioactive wastes, notably radioactive alumina, sewage sludges from effluents of nuclear power plants, the incorporation rate then being maximum.

The melting temperatures of the ternary diagrams with hematite and boric anhydride are significantly lower, which is favorable and corroborated by experimental results, especially in the presence of boric anhydride.

As regards the investigated wastes, (soil and concrete) the compositions of the larnite/gehlenite eutectic valley are much closer to those of the initial waste than to the eutectic E: this valley is attained by adding 20% by mass of alumina to the soil, while 25% of alumina and 129% of silica would have to be added in order to attain the eutectic E. For an initial waste with an apparent density of 1.1, the incorporation rate is then 3.0 in the valley, instead of 1.6 for the eutectic E.

The conducted tests have shown that soil, the stones of which have been extracted beforehand (a grain size greater than 1 cm, representing 50% of the initial mass), melts at 1,530° C., without any addition of alumina. By grain size sorting, if necessary, completed by washing with water, it is possible to declassify the stones of the WA (weakly active), VWA (very weakly active) category. The latter waste category requires less strict packaging than the WA wastes (putting into a big-bag, without any immobilization) and the handling cost is lower. Grain size separation of the stones, notably during the treatment of a limestone soil, not only allows reduction in the volume of waste to be treated, but also a favorable composition adjustment may be achieved.

Boric anhydride, considered previously as a substitute for alumina, may also be considered as a flux agent (with the purpose of reducing the melting temperature). As a flux agent, additions will practically be limited to less than 10%. Beyond, foam problems occur. Soda is also a known flux agent agent. In equal proportion, its effect is not as strong as that of boric anhydride.

With the silica enrichment, other eutectic valleys may be attained (larnite/rankinite, rankinite/pseudo-wollastonite, pseudo-wollastonite/gehlenite, pseudo-wollastonite/gehlenite/anorthite triple point) as quickly as with enrichment in alumina, the valley between gehlenite and larnite may be attained.

The silica-depleted eutectic valleys around the compounds $3CaO.Al_2O_3$, $5CaO.3Al_2O_3$, $CaO.Al_2O_3$, $CaO.2Al_2O_3$ concern binary composition wastes ($CaO$ and $Al_2O_3$), while the present invention concerns ternary compositions. But the behavior of the mixture is probably close to that of the investigated mixtures.

F—INDUSTRIAL TESTS (EXAMPLES 10 TO 12)

Heating of the waste by the Joule effect was carried out by immersing graphite electrodes into the wastes, as described earlier.

From the examples hereafter, it emerges that in the presence of the graphite of the electrodes, the iron oxides are reduced into metal iron, according to the same chemical reactions as those produced in a blast furnace, when iron ore is heated in the presence of coal.

The melt then separates into 2 phases, one consisting of the synthetic rock with the target composition according to the invention in which $X_2O_3$ is $Al_2O_3$, the other one consisting of cast iron (iron+carbon); after solidification the iron is again found in the form of small metal inclusions with a size of less than 2 cm in the synthetic rock.

The cooled block nonetheless forms a packaged waste material, acceptable by a center for surface storage of radioactive waste. For the tested wastes (with less than 5% of iron oxides, as in Example 11) the consumption of graphite electrodes which results from this, is negligible (less than 1% of the treated mass).

For wastes which are more loaded with iron (cf. Example 12) or iron oxide (cf. Example 10), it may be interesting to promote this biphasic behavior, notably by adding carbon (carbon black, powdered graphite, coal) in a stoichiometric proportion with iron oxide, so as to avoid or reduce the consumption of electrodes. The final waste is more compact, because the reduction of the oxide into a metal releases mass in the form of $CO_2$ gas but especially because the cast iron is denser than the synthetic rock (7,000 kg/m$^3$ versus 2,700 kg/m$^3$).

The relevant wastes are in particular sludges (cf. Example 10), concretes with scrap iron (cf. Example 12).

However, if the intention is to avoid reduction of iron oxides by the graphite of the electrodes, it is sufficient to operate the oven with an arc, i.e. without immersing the electrodes in the melt, (electrodes above the pool). In this case, it is possible to avoid segregation of metal cast iron and retain involvement of the iron oxides in said target composition. There remains the fact that the electrodes are nonetheless consumed by emission of $CO_2$, even if they do not modify the redox characteristics of the melt.

In Examples 11 and 12, the target composition was included in the domain of larnite ($2CaO.SiO_2$), with a lime content close to 60%. It is found that melting occurs around 1,600° C., well before the theoretical temperature (>1,900° C.), that the solid formed contains a high proportion of gehlenite, and that, consequently, resistance to leaching is acceptable. Moreover, the mechanical characteristics are good, and especially the density is remarkably high (greater than 3), which allows reduction in the volume of final waste.

Example 10

Treatment of Sludge from a Nuclear Power Station

The following starting compositions were applied (in mass %):

| | Component | | | | |
|---|---|---|---|---|---|
| | $CaCO_3$ | $SiO_2$ | $Al_2O_3$ | $Fe_2O_3$ | Other minerals | Humidity and organics |
| Soil (%) | 67.5 | 17.1 | 4.5 | 1.3 | 1.4 | 8.2 |
| Mud (%) | 12.3 | 11.5 | 2.1 | 9.1 | | 65 |

These compositions are identical with those mentioned earlier, illustrated in references 6 for the soil and 7 for the sludge in FIG. 2, except that the sludge contains 65% of water.

A soil-sludge-alumina (adjuvant) mixture in proportions of 50%-45%-5% melts around 1,600° C. and a biphasic product is obtained comprising a synthetic rock incorporating small cast iron inclusions, of the following composition:

| | Components | | | | |
|---|---|---|---|---|---|
| | CaO | $SiO_2$ | $Al_2O_3$ | Cast iron | Other minerals |
| Mass % | 44.3 | 29.1 | 17.4 | 7.8 | 1.4 |

The phase of the synthetic rock is shown in FIG. 3, with reference 9-1, in the gehlenite domain.

The initial volume of 100 kg of waste (sludge+soil, except alumina) is of 86.9 L, the final volume is 17.2 L: the volume reduction factor is 5.1. This very favorable reduction factor is due to:
- the water content of the sludge
- to the soil-sludge mixture limiting the required additions
- to the separation of the cast iron as an inclusion, and to the density of these inclusions.

The synthetic rock block includes cast iron inclusions, with a total mass of 3.6 kg and a total volume of 0.54 L for 100 kg of initial waste.

Density values:
- sludge: 1.2 kg/L
- soil: 1.1 kg/L
- synthetic rock: 2.7 kg/L
- cast iron: 7 kg/L.

Example 11

Treatment of Soil Completed with Alumina

With the soil composition of Example 10, and addition of only 4% of alumina (96% of soil for 4% of alumina), the mixture melts around 1,600° C. (because of impurities outside CAS of the soil) and a biphasic product is obtained, comprising a synthetic rock including cast iron inclusions of the following composition:

| | Component | | | | |
|---|---|---|---|---|---|
| | CaO | $SiO_2$ | $Al_2O_3$ | Cast iron | Other mineral |
| Mass % | 57.5 | 25.9 | 13.1 | 1.4 | 2.1 |

The target composition of the synthetic rock is illustrated in reference 9-2 in FIG. 3, in the larnite domain.

The initial volume of 100 kg of waste (sludge+soil, except alumina) is 90.9 L, the final volume is 21.8 L: the volume reduction factor is 4.2, this very favorable reduction factor is due to the smallness of addition of alumina (smallness authorized by the proximity of the starting composition of the soil and of the target composition), and to the strong density of the synthetic rock (3 kg/L).

Example 12

Treatment of Concrete with Scrap Iron Containing about 15% of Iron

A crude concrete without any scrap iron was applied, with the following composition (mass %):

| | Component | | | | | |
|---|---|---|---|---|---|---|
| | $CaCO_3$ $Ca(OH)_2$ | $SiO_2$ | $Al_2O_3$ | $Fe_2O_3$ | Other minerals | Water |
| Concrete (%) | 58.9 | 30.1 | 3.0 | 0.4 | 1.6 | 6 |

This composition of crude concrete is identical with the one used earlier.

The concrete composition was supplemented with 20% by mass of scrap iron.

It is interesting to mix this concrete with lime in order to enrich it in calcium. Certain concretes are originally richer in calcium. A concrete with a scrap iron-lime-alumina (adjuvant) mixture in proportions of 75%-17%-8% melts around 1,600° C. and a biphasic product of a synthetic rock incorporating cast iron inclusions of the following composition, similar to the one of Example 11 is obtained, but with a larger proportion of cast iron:

| | Component | | | | |
|---|---|---|---|---|---|
| | CaO | $SiO_2$ | $Al_2O_3$ | Cast iron | Other minerals |
| Mass % | 47.8 | 21.4 | 11.6 | 18.0 | 1.1 |

The target composition of the synthetic rock is illustrated in reference 9-2 in FIG. 3, in the larnite domain, like for Example 11.

The initial volume of 100 kg of waste (only concrete with scrap iron) is 100 L (the scrap iron concrete as rubble is denser than concrete without scrap iron), the final volume is 18.9 L: the volume reduction factor is 5.3 which is very favorable, is due to:
- the strong density of the synthetic rock (3 kg/L, excluding cast iron inclusions)
- the separation of the inclusions' cast iron, and to the density of these inclusions.

The synthetic rock block includes cast iron inclusions, with a total mass of 10.5 kg and a total volume of 1.7 L for 100 kg of initial waste.

The invention claimed is:

1. A method for packaging radioactive wastes, wherein the following successive steps are carried out:
   a/ radioactive wastes are treated for which the composition of the dry extract after calcination at 950° C., called starting composition hereafter, comprises at least 90% of compounds selected from CaO, $Fe_2O_3$, $SiO_2$, $Al_2O_3$ and $B_2O_3$, and the composition of said wastes is supplemented so as to attain a target composition of said supplemented wastes after calcination, and b/ said supplemented radioactive wastes are melted and c/ said melt is cast in a container, so as to obtain after cooling, a monolith product comprising a synthetic either glassy or vitro-crystalline rock, having said target composition, wherein said starting composition and said target composition meet the following definitions, in a ternary (CaO, $SiO_2$ and $X_2O_3$) system, wherein $X_2O_3$ is a trivalent oxide or a mixture of trivalent oxides selected from $Al_2O_3$, $Fe_2O_3$ et $B_2O_3$:

for said starting composition:
$P_C$ and $P_X$ are less than 90%, and
$P_S$ is less than 75%, and for said target composition:
$P_C$ is from 35 to 60%, and
$P_S$ is from 10 to 45%, with, in both cases:
$P_C+P_S+P_X=100\%$, and
$P_X=P_A+P_H+P_B$, with
$P_C=[M_C/(M_C+M_S+M_A+0.28M_H+2M_B)]\times 100\%$, and
$P_S=[M_S/(M_C+M_S+M_A+0.28M_H+2M_B)]\times 100\%$, and
$P_A=[M_A/(M_C+M_S+M_A+0.28M_H+2M_B)]\times 100\%$, and
$P_H=[0.28M_H/(M_C+M_S+M_A+0.28M_H+2M_B)]\times 100\%$, and
$P_B=[2M_B/(M_C+M_S+M_A+0.28M_H+2M_B)]\times 100\%$, and
$P_i$ and $M_i$, with i=C, S, A, H or B, are the mass percentages ($P_i$) and the masses ($M_i$) of CaO (i=C), $SiO_2$ (i=S), $Al_2O_3$ (i=A), $Fe_2O_3$ (i=H) et $B_2O_3$ (i=B) respectively.

2. The method according to claim 1, wherein:
in step b/, the radioactive wastes are heated in a crucible and are melted at a temperature of 1,250 to 1,650° C., and in step c/, said melt is cast into a container, with a capacity of at least 200 L, so as to form said monolith and said thereby melt packaged is cooled, without any annealing, down to room temperature, within a period of less than 15 days.

3. The method according to claim 2, wherein in step c/, the cooling step is carried out in two steps, namely:

c.1/ the cooling rate of said container filled with said melt is limited in the cooling phase between 1,250 and 1,000° C., to a cooling rate comprised between 50° C./h and 250° C./h, and c.2/ the cooling of said container is then completed from 1,000° C. down to room temperature, without any limitation of the cooling rate, by placing said container in open air or quenching it in cold water until its temperature is lowered down to room temperature.

4. The method according to claim 1, wherein said radioactive wastes comprise of limestone soil, concrete rubble, sludges from nuclear power plants, concentrates from evaporators of nuclear power plants, sand, and/or ashes of incinerated radioactive waste.

5. The method according to claim 1, wherein said initial radioactive wastes have an starting composition meeting the following definition in the ternary $CaO/SiO_2/X_2O_3$ system, wherein $X_2O_3$ and $P_i$ have the meanings given in claim 1, with:
Pc and $P_X$ are less than 75% and Ps is less than 60%.

6. The method according to claim 1, wherein said target composition corresponds to the following mass percentages:
$P_C$ comprised between 40 and 50%, and
$P_S$ comprised between 20 and 40%.

7. The method according to claim 1, wherein in step a/, the following steps are carried out, wherein:

a.1/ a limestone soil and/or concrete rubble are treated for which said starting composition meets the following definition in a ternary $CaO/SiO_2/X_2O_3$ system, wherein $X_2O_3$ and $P_i$ have the meanings given in claim 1:
$P_C$ is comprised between 30 and 80%, and
$P_x$ is less than 20%, and a.2/ 5 to 50% of $X_2O_3$ selected from $Al_2O_3$, $Fe_2O_3$ and $B_2O_3$ are added.

8. The method according to claim 7, wherein in step a.2/, a $B_2O_3$ addition of less than 10% of the mass of radioactive wastes to be treated is carried out and/or $P_B$ is less than 15% in said target composition of the obtained monolith.

9. The method according to claim 8, wherein in step a.2/:
the $B_2O_3$ addition is less than 5% of the mass of radioactive wastes to be treated in step a.1/ and/or $P_B$ is less than 7% in said target composition of the obtained monolith, and
the addition of $Al_2O_3$ and $Fe_2O_3$ is greater than 10% of the mass of radioactive wastes to be treated in step a.1/, and/or $P_X$ is greater than 15% in said target composition of the obtained monolith.

10. The method according to claim 1, wherein the mixing of radioactive wastes of different compositions is achieved in order to obtain said target compositions, without adding non-radioactive trivalent oxide(s) selected from $Al_2O_3$, $Fe_2O_3$ and $B_2O_3$.

11. The method according to claim 5, wherein the method is proceeded with the mixing of:

1/ said limestone soil and/or said concrete rubble of said following starting compositions:
$P_C$ comprised between 50 and 80% and $P_X$ less than 20%, and 2/ a sludge of radioactive wastes, preferably a sludge from a nuclear power station, of said following starting composition:
$P_X$ comprised between 10 and 70% and $P_C$ less than 50%.

12. The method according to claim 7, wherein in step a/, the following steps are carried out wherein:

a.1/ limestone soil and/or concrete rubble are treated, for which said starting composition meets the following definition in the ternary $CaO/SiO_3/X_2O_3$ system:
$P_C$ is comprised between 50 and 80%, and
$P_S$ is comprised between 20 and 50%, and
$P_X$ is less than or equal to 20%, $X_2O_3$ being a trivalent oxide or a mixture of trivalent oxides selected from $Al_2O_3$ and $Fe_2O_3$, and $P_B=0$, and a.2/ the additive containing $X_2O_3$ is added in order to attain said following monolith target composition in the $CaO/SiO_3/X_2O_3$ ternary system:
$P_C$ is comprised between 35 and 55%, and
$P_S$ is comprised between 15 and 40%, and
$P_X$ is comprised between 10 and 45%.

13. The method according to claim 1, wherein the large particles with a size of more than 1 cm, are extracted from the limestone soils so that the composition of the fine portion approaches the target composition, so that it attains said target composition.

14. The method according to claim 1, wherein:
in step b/, said additional radioactive wastes are melted by Joule effect heating, by means of graphite electrodes immersed in the material of radioactive wastes to be treated, and in step c/, a biphasic product is obtained, comprising a synthetic rock matrix having said target composition wherein in $X_2O_3$ is selected from $Al_2O_3$ and $B_2O_3$, said matrix incorporating cast iron inclusions.

15. The method according claim 2, wherein:
before introducing said radioactive wastes into said crucible, milling of said radioactive wastes is carried out in order to obtain a grain size of less than 5 cm of at least one portion of the particles which it contains, and
the fumes released during the melting of the radioactive wastes are cooled to less than 200° C. and the gaseous radio-elements such as cesium, which they contain, are trapped in a particle filter.

\* \* \* \* \*